(12) United States Patent
Crichlow

(10) Patent No.: US 11,085,270 B2
(45) Date of Patent: Aug. 10, 2021

(54) IN-SITU VITRIFICATION OF HAZARDOUS WASTE

(71) Applicant: Henry Crichlow, Norman, OK (US)

(72) Inventor: Henry Crichlow, Norman, OK (US)

(*) Notice: Subject to any disclaimer, the term of this patent is extended or adjusted under 35 U.S.C. 154(b) by 0 days.

(21) Appl. No.: 16/815,402

(22) Filed: Mar. 11, 2020

(65) Prior Publication Data

US 2020/0269293 A1    Aug. 27, 2020

Related U.S. Application Data

(63) Continuation-in-part of application No. 16/285,199, filed on Feb. 26, 2019, now Pat. No. 10,807,132.

(60) Provisional application No. 62/970,642, filed on Feb. 5, 2020.

(51) Int. Cl.
  *B09B 1/00*     (2006.01)
  *E21B 36/04*    (2006.01)

(52) U.S. Cl.
  CPC ................... *E21B 36/04* (2013.01)

(58) Field of Classification Search
  CPC ........................................ E21B 36/04
  See application file for complete search history.

(56) References Cited

U.S. PATENT DOCUMENTS

| | | | |
|---|---|---|---|
| 4,326,842 A * | 4/1982 | Adachi | G21F 9/30 425/10 |
| 4,376,598 A | 3/1983 | Brouns et al. | |
| 4,572,299 A | 2/1986 | Vanegmond et al. | |
| 4,956,535 A | 9/1990 | Buelt et al. | |
| 5,000,617 A * | 3/1991 | Eggert | G21F 9/24 405/129.35 |
| 5,004,373 A | 4/1991 | Carter | |
| 5,024,556 A | 6/1991 | Timmerman | |
| 5,065,818 A | 11/1991 | Van Egmond | |
| 5,100,259 A | 3/1992 | Buelt et al. | |
| 5,181,795 A | 1/1993 | Circeo et al. | |
| 5,215,146 A | 6/1993 | Sanchez | |
| 5,276,253 A * | 1/1994 | Circeo, Jr. | B09B 1/00 405/128.65 |
| 5,643,350 A | 7/1997 | Mason et al. | |
| 5,673,285 A | 9/1997 | Wittle et al. | |
| 6,120,430 A | 9/2000 | Hansen et al. | |

(Continued)

*Primary Examiner* — Janine M Kreck
(74) *Attorney, Agent, or Firm* — Eric Kelly

(57) ABSTRACT

In-situ vitrification of hazardous waste occurs within human-made caverns. The human-made caverns may be located at distal (terminal) ends of substantially vertical wellbores and the human-made caverns may be located within deep geological rock formations, that are located at least two thousand feet below the Earth's surface. The hazardous waste that is vitrified into glass within such human-made caverns may be radioactive. The vitrification within a given human-made cavern is accomplished by at least one heater that operates according to a predetermined heating and cooling profile. During vitrification the heater may be reciprocated up and down to introduce currents into the waste liquid for uniform temperature dispersion. The heater may be removable, reusable, single use, and/or disposable. Cold caps and/or insulating blankets may be used over a given layer of vitrified waste product within the given human-made cavern. Heater weights, mixing vanes, and/or downhole sealing packer may also be used.

54 Claims, 14 Drawing Sheets

(56) References Cited

U.S. PATENT DOCUMENTS

| | | | |
|---|---|---|---|
| 7,069,993 B2 * | 7/2006 | Hill | E21B 36/04 166/248 |
| 8,309,784 B2 | 11/2012 | Pinet et al. | |
| 2010/0303192 A1 * | 12/2010 | Antignano | G21D 1/00 376/273 |

* cited by examiner

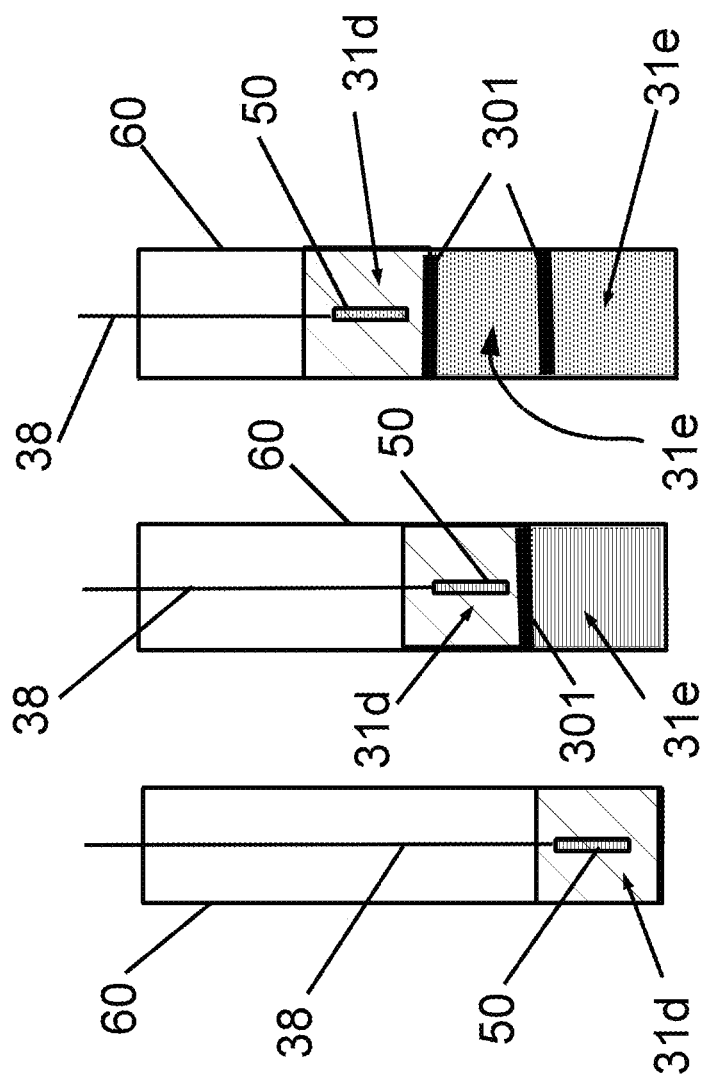

IN-SITU VITRIFICATION OF HAZARDOUS WASTE

PRIORITY NOTICE

The present application claims priority under 35 U.S.C. § 119(e) to U.S. Provisional Patent Application Ser. No. 62/970,642 filed on Feb. 5, 2020, the disclosure of which is incorporated herein by reference in its entirety.

The present patent application is a continuation-in-part (CIP) of U.S. non-provisional patent application Ser. No. 16/285,199 filed on Feb. 26, 2019, and claims priority to said U.S. non-provisional patent application under 35 U.S.C. § 120. The immediately above-identified patent application is incorporated herein by reference in its entirety as if fully set forth below.

TECHNICAL FIELD OF THE INVENTION

The present invention relates in general to in-situ vitrification of waste materials and more specifically to the in-situ vitrification of waste materials in human-made subterranean caverns and the subsequent containment, storage, and/or subsequent disposal of the vitrified materials and products within these human-made subterranean cavities located in deep (underground) geological formations.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

In the United States and other countries across the globe, the nuclear weapons production industry has left a massive and devastating legacy when the nuclear reactors were decommissioned. For example, the nuclear weapons manufacturing processes have left behind about 53 million US gallons (or about 200,000 cubic meters) of high-level radioactive waste stored within 177 storage tanks. In addition, about 25,000,000 cubic feet (or about 710,000 cubic meters) of solid radioactive waste have been produced; as well as, a resulting contamination zones covering several square miles with contaminated groundwater beneath the sites. Much of this liquid waste has been leaking into the surrounding the earth (soils, rocks, formations, and strata) creating significant health, environmental, and economical problems. There is a tremendous safety and environmental need to store and/or dispose of such radioactive materials (wastes).

Radioactive waste is often generally categorized as high level waste (HLW) or low level waste (LLW).

In the past, it has been challenging, dangerous, and/or expensive to try to store radioactive and/or nuclear materials (such as radioactive/nuclear waste materials) in underground structures, except in some limited scenarios for those cases where solid quantities of material are stored in barrels, individual capsular containers, slurry material, open pits and also within shallow mines which are very close to the surface.

Many processes have been studied and implemented in different forms to dispose of, get rid of, and/or contain these dangerous waste materials. For example, "vitrification" has been tried in several countries.

Vitrification is a process in which a substance is transformed into a glass. Glass may be defined as a non-crystalline amorphous solid. Glass may also be defined in a broader sense to include solids that are amorphous in structure at the atomic scale and that exhibit a reversible change from a hard and relatively brittle state into a viscous or rubbery state when heated above a given melting temperature. This reversible change point may be defined as the "glass transition point."

Vitrification is usually achieved by heating materials to a liquid state, then cooling the liquid, often rapidly, so that it passes through the glass transition point to form a glassy solid, i.e., a glass.

In practice, vitrification involves melting of waste materials with glass-forming additives, usually called "frit" so that the final vitreous product incorporates the waste contaminants macroscopically and microscopically. The vitrified glass material is usually referred to as "melt" during the glass-forming process. In the macroscopic form, the waste material may be considered encapsulated; while, in the microscopic form, the waste material forms an integral structural part of the glass material.

Glass has many physical and chemical properties and attributes that make it an ideal candidate for the reliable waste immobilization, for safe long-term storage, for transportation, and for consequent disposal of nuclear, radioactive, and/or hazardous waste materials. Glass is amorphous. It has been shown to be generally insensitive to the effects of radiation and radioactive decay. The finished glass material can chemically and physically incorporate many waste elements and products over wide composition ranges. The basic glass-making process has been practiced for millennia, it is relatively simple and offers a means for waste disposal in radioactive operations in which massive volumes of HLW and/or LLW need to be safely disposed of. The HLW that has to be disposed of, generally contains insufficient amount of glass precursors, such as, but not limited to, silicon, and as such, to produce a long lived glass product silica and/or other glass-forming materials may be added chemically and/or as a glass product called frit.

The vitrification process applied to nuclear waste is attractive, at least in part because it is flexible and/or it is applicable to a variety of radioactive elements that may be incorporated in the glass. In addition, the glass product is minimally leachable, resists corrosion, it is durable and the compactness, volume reduction and ease of handling of the waste form are all positive attributes. Natural analogues of vitrified products include silicate glasses found in the geologic record from volcanic glasses, these records have displayed minimal degradation processes over several million years.

Vitrification is a mature technology and has been used for HLW immobilization in many batch or continuous processes in limited volumes for more than 50 years in France, Germany, Belgium, Russia, UK (United Kingdom), India, Japan, and in the United States (US).

The prevailing concepts in vitrification of nuclear waste, focus on the long-held view currently exhibited by the major US companies disposing of nuclear waste. These US companies are spending an enormous of money, up to $37 billion (in US dollars) projected in 2019 to: (a) vitrify the waste in massive plants employing several thousand workers; (b) store the vitrified products in stainless steel containers; (c) transport the vitrified products to disposal locations; (d) entomb the vitrified containers in shallow salt formations; and (e) to then wait for mother nature to encapsulate the glass bearing containers to be subsumed by the salt encroachment over thousands of years of geologic time before leaching or surface contamination can occur via migration of radionuclides.

This current practice has essentially spent and continues to spend billions of dollars to merely "kick the can down the road" for future generations to deal with. The waste is contained (temporarily) but it has not been disposed of.

Today, there is a well felt need for a better and more complete solution to the HLW and LLW waste problem.

It is at least one objective of this inventive application to solve the containment and disposal problem as completely as possible.

To this end this patent application may combine at least some existing prior art elements, introduce additional novel concepts, and attains a level of disposal and containment that hitherto has not been achieved by providing an in-situ vitrification process deep in geological formations (e.g., rocks) from which no (waste) material can migrate over millions of years of geologic time.

There has not been any attempt to vitrify radioactive materials in-situ in very deep geologically located caverns as illustrated in the subject patent application because: (1) such caverns do not generally naturally exist in rock formations at very great depths; (2) it had been impossible to economically fabricate or produce large diameter caverns or to implement them in deep enough geological formations which are necessary to maintain a level of safety such that there would be no migration of radionuclides from the radioactive materials to the surface over geologic time; (3) the requisite technology to vitrify the waste material though available at the surface has only been tried in shallow surface pits and has not been extended to deep underground systems; and/or (4) the electrical power systems needed to transmit, control, and deliver sufficient electric power to deep downhole heaters had not been safely nor operationally perfected.

The process of vitrification may be simple in some respects, consider for example: (a) the given waste is dried, then heated to convert nitrates to oxides; (b) glass-forming additives or frit may added, as needed or desired, to the waste material and heated again to a given and predetermined melt temperature (e.g., around 1,000 degrees Celsius to around 1,500 degrees Celsius); (c) the now molten liquid is poured into a suitable containment vessel to cool and form the solid glass; and (d) the solidified vitreous product has incorporated the waste materials in its macro- and microstructures, and the hazardous waste constituents are thus immobilized within the glass. For example, borosilicate and phosphate glasses are the two main types of glass frit currently used to immobilize nuclear waste (both of these materials can immobilize large amounts of radioactive products).

The ability to economically provide a human-made cavern, located within a deep geological formation, of sufficient size and volume, for efficient in-situ vitrification and also for safe disposal of substantial quantities of vitrified radioactive waste is completely feasible with embodiments of the inventions disclosed herein. What is required is more than just the ability to vitrify some small amounts of nuclear waste in a series of surface batch operations, there are real needs for the economic vitrification, disposal and storage of massive quantities of waste in the millions of gallons. To date (2020), the current best available technology at the Hanford site in the US contemplates an expensive, single, stand-alone vitrification unit. If that unit fails, the vitrification industry stops until a better solution is found.

The systems and/or methods that are proposed herein in this invention are different. Some embodiments contemplated may provide for a means to significantly multiply the application of the novel systems and/or methods by running multiple systems in parallel. Just like in the oil and gas industry where literally dozens of oil wells can be drilled by individual drilling rigs simultaneously to develop a given field, a plurality of vitrification systems can be implemented to provide up to fifty or more simultaneous in-situ vitrification operations at the same or different locations across a given country. This application may provide a measurable economy of scale to resolve this seemingly intractable problem of disposing of millions of gallons of waste.

At least some of the technical drivers that have allowed the embodiments of present invention herein to be implemented may be as follows: (a) drilling rig design features have improved; (b) increased hydraulic pressure availability downhole in the wellbore at the drill bit; (c) available drilling rig horsepower up to as much as 4,000 hydraulic horsepower; (d) available pump horsepower; (e) available drilling rig capacity up to 2,000,000 pounds of dead weight lift is available; and/or (f) high downhole drilling fluid pressures can be maintained. These may provide for the ease of implementation of deep human-made caverns for in-situ vitrification and for loading or disposing of waste products into such human-made caverns.

Specific technological improvements that pertain to the drilling of under-reaming operations and under-reaming equipment have allowed successful under-reaming needed to make and manage large diameter human-made caverns. At least some of these improvements may include: (a) hydraulically actuated reamer elements expandable and retractable with pump pressure and downhole RFID (radio frequency ID) triggering with injected RFID tags; (b) cutter arms movable upward and out simultaneously in the body; (c) fail-safe cutter arm retraction; (d) reverse actuating mechanism maintains that tool is open while drill string weight prohibits tool closure; (e) unrestricted fluid flow through internal diameters of the wellbore tubular goods; (f) roller cone cutters are specifically designed for the Drill Time Under-reamers and are consistent with downhole diameters; (g) reamer bodies machined from heat-treated steel bar, giving it exceptional strength; (h) jet nozzles near the cutters allow for cutter washing and cooling; and (i) a variety of cutting structures are available to facilitate the reaming process.

Additionally, the electric power and applied industries have developed and implemented improved, surface facilities, control mechanisms and power cables which deliver electric power efficiently and controllably to the downhole heater equipment. Power cables have significant improvements and are now capable of transmitting megawatts of power over several thousand feet in a wellbore environment regularly and safely without accident. These computerized systems can minimize power losses in transmission, maximize energy deliverability downhole, allow the types of temperature control needed to optimize the melt process and the annealing and cooling of the melt in the subterranean cavern during vitrification.

Today (2020), the understanding of vitrification processes and operational conditions have improved considerably. The compositions of the waste, the chemical and physical formulation of the frit and other physical descriptors have been studied by investigators across the globe. Additionally, the development and application of computational fluid dynamic (CFD) modelling platforms for vitrification simulation have provided insights into and preconditions necessary for an optimal vitrification process without the need for hundreds of time consuming and ineffective laboratory or small-scale experiments.

Though most physical vitrification test efforts have been on small scale experiments, it is generally accepted that larger batch operations can be more tolerant to compositional variations than small scale laboratory tests. The inventive systems taught in this application are for very large cavern-based waste systems in which several tons of waste are controllably vitrified in massive underground cylindrical cavern(s) with electrically powered heating controlled from the terrestrial surface.

Recapping at least some of the above discussion, some embodiments of the present invention may provide means, systems, mechanisms, and/or methods for the vitrification and/or disposal of nuclear/radioactive materials (waste) (and/or other hazardous waste) within human-made subterranean cavities (caverns) within deep geological formations in manners that may be safe (for humans and the environment), economically feasible, and efficient.

These and other advantages and features of the present invention are described herein with specificity so as to make the present invention understandable to one of ordinary skill in the art, both with respect to how to practice the present invention and how to make the present invention.

Turning now to a discussion of the prior art. The prior art related to this patent application has been developed in three primary technical areas of interest.

The first area is the thermal oil recovery systems that have been used in the heavy oil production industries and have been utilized to develop downhole heaters, long distance power cables to deliver electric power safely and efficiently downhole; and also the power generation and delivery systems which are implemented on the terrestrial surface.

The second area focuses on the vitrification process with emphasis on the glass form and melt systems which include chemical and mechanical design of the materials and compositions used in the glass processing systems. Specifically, in developing and optimizing the glass melt material to ensure correct melt behavior and lower energy costs. More than 30 vitrification processes have been documented by the IAEA (International Atomic Energy Agency) in the last 50 years.

The third area is related to historical environmental operations to vitrify contaminants in shallow soils and also in the surface pits or shallow wellbores, often less than 20 feet deep, and also in some applications in shallow holes used for support pilings in the building and construction industry.

Specifically, the prior art involves the thermal recovery of heavy oils in the oil industry, that have been utilized for more than 60 years. In these oil recovery processes, deep "heavy oil" reservoirs that contain viscous heavy crudes have been thermally stimulated by wellbore heaters which heat up the adjacent rock formations radially and vertically and make the viscous crude more mobile by decreasing crude viscosity. These recovery processes may range in depth from 500 feet to more than 4,000 feet deep from the terrestrial surface. In these systems, electric power cables to deliver the power, downhole in-wellbore heaters, downhole packers (seals) to control flow, and surface power delivery systems may be utilized installed. Safety systems have also been developed for the operations and installations that are capable of operating safely and that have been used for decades.

In addition to the thermal recovery methods in wellbores, another complimentary area of technology and investigation has been "rock welding." This prior art process has been developed to facilitate the sealing of the vertical wellbores used for nuclear waste disposal. Operationally, the "rock welding" method involves the utilization of electrical downhole heaters to provide sufficient heat energy to melt several feet of the vertical wellbore zone at temperatures in excess of 800 degrees Celsius. The melted rock is allowed to cool forming a homogenous matrix within and with the native rock thus completely sealing the nuclear waste inside the bottom portions of the wellbore.

The second element is the glass melt composition, its formulation and its operating parameters. For centuries, glass making is a well-developed industry and the glass-making operations are worldwide, massive, and provide a range of compositions of glass forming materials to meet many requirements in industry.

The compositions of glass forming additives, the temperatures of operations, the timing of the processes, and the time temperature profiles for annealing of the melt to meet required glass in products are well detailed in practice and have been used successfully for many years. Today (2020) many melt process operating parameters are developed by computational simulation models before they are implemented in the field. This minimizes costs and enhances the level of success of the projects. Furthermore, by incorporating Artificial Intelligence (AI) methodologies on the vast historical and evolving database of information on glass forming and vitrification, an AI driven "front end" approach may be employed to optimize the processing systems that may be used in the inventive means taught in this application.

The third area involves the utilization of surface and near surface vitrification processes to treat contaminated soils and hazardous chemicals to convert them to stable glass products. These operations resemble "open burning pit" processes for trash incineration, except the near surface vitrification system uses multiple high voltage electrical electrode arrays embedded in the soil material which when energized are capable of heating the soil to melting temperatures, e.g., often in excess of 2,000 degrees Celsius. As the waste material melt grows, power is maintained to offset heat losses from the surface and the surrounding soil region. The off gases produced create a problem which has been resolved usually by the use of a hood to collect and control off gas movement.

BRIEF SUMMARY OF THE INVENTION

To minimize the limitations in the prior art, and to minimize other limitations that will be apparent upon reading and understanding the present specification, the present invention may describe means, systems, mechanisms, and/or methods for the vitrification of waste materials, including nuclear and/or non-nuclear materials, into deep underground caverns, located within deep geological formations.

Briefly, the vitrification method in accordance with some embodiments of this invention may achieve at least some of the intended objectives by including the steps of: drilling a pilot wellbore which intersects a deep geologic formation; forming of a human-made cavern within that deep geological formation, using the pilot wellbore; implementing an electrically energizable heating system in the subject human-made cavern into which the waste products have been disposed, for subsequent vitrification. and while safely disposing of the off-gas products (from the vitrification) in subterranean formations, while allowing the melted waste to remain sequestered in the given human-made cavern for thousands of years, if so desired.

It is an objective of this inventive application to solve the containment and disposal problem of nuclear, radioactive, and/or hazardous wastes as completely as possible.

In light of the problems associated with the known methods of vitrifying waste (including in liquid/slurry format), it may be an objective of some embodiments of the present invention, to provide methods for the vitrification of nuclear waste and other (waste) material in human-made caverns which is safe, with very high volumetric capacity, that is cost-effective, that is easily deployable, and that may meet the regulatory requirements for safety and environmental protection.

It may be another objective of some embodiments of the present invention to provide methods of the types described herein wherein the vitrification processes may occur several thousand feet below the terrestrial surface away from potential contamination of the ecosphere.

It is an objective of the present invention to provide means, systems, mechanisms, and/or methods for the vitrification and/or disposal of nuclear/radioactive materials (waste) (and/or other hazardous waste) within human-made subterranean cavities (caverns) within deep geological formations in manners that may be safe (for humans and the environment), economically feasible, and efficient.

It is another objective of the present invention to provide systems and methods for in-situ vitrification of hazardous waste occurs within human-made caverns, wherein the human-made caverns are within deep geological rock formations, that are located at least two thousand feet below the Earth's surface.

It is another objective of the present invention to provide systems and methods for in-situ vitrification of hazardous waste occurs within human-made caverns, wherein heating to liquify the hazardous waste and its subsequent cooling to glass operates according to predetermined heating and cooling profiles.

It is another objective of the present invention to provide systems and methods for in-situ vitrification of hazardous waste occurs within human-made caverns, wherein heating to liquify the hazardous waste may occur in part by a heater that reciprocates up and down in the liquified hazardous waste to impart a uniform temperature to the liquified hazardous waste.

It is another objective of the present invention to provide systems and methods for in-situ vitrification of hazardous waste occurs within human-made caverns, wherein heating to liquify the hazardous waste may occur in part by a heater that with mixing vanes for imparting currents into the liquified hazardous waste that results a uniform temperature to the liquified hazardous waste.

It is another objective of the present invention to provide systems and methods for in-situ vitrification of hazardous waste occurs within human-made caverns, wherein the heaters may be removable, reusable, single use, and/or disposable.

It is another objective of the present invention to provide systems and methods for in-situ vitrification of hazardous waste occurs within human-made caverns, wherein cold caps and/or thermal insulating blankets may be used over a given layer of vitrified waste product within the given human-made cavern.

It is yet another objective of the present invention to provide systems and methods for in-situ vitrification of hazardous waste occurs within human-made caverns, wherein the human-made caverns are within deep geological rock formations, wherein a portion of the deep geological rock formations may be used as a reservoir for long-term storage/disposal of off-gas from the vitrified hazardous waste.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 3B, FIG. 3C, and FIG. 3D may be three figures intended to viewed together and in sequence, as these three figures may depict sequential operations in a given vitrification process.

FIG. 3B may depict a generalized view of an initial loading of a melt mixture in a human-made subterranean cavern system of multiple vitrification runs.

FIG. 3C may depict a generalized view of a second loading of the melt mixture in the human-made subterranean cavern system of multiple vitrification runs.

FIG. 3D may depict a generalized view of a final loading of the melt mixture in the human-made subterranean cavern system of multiple vitrification runs.

REFERENCE NUMERAL SCHEDULE

Figure 1A:
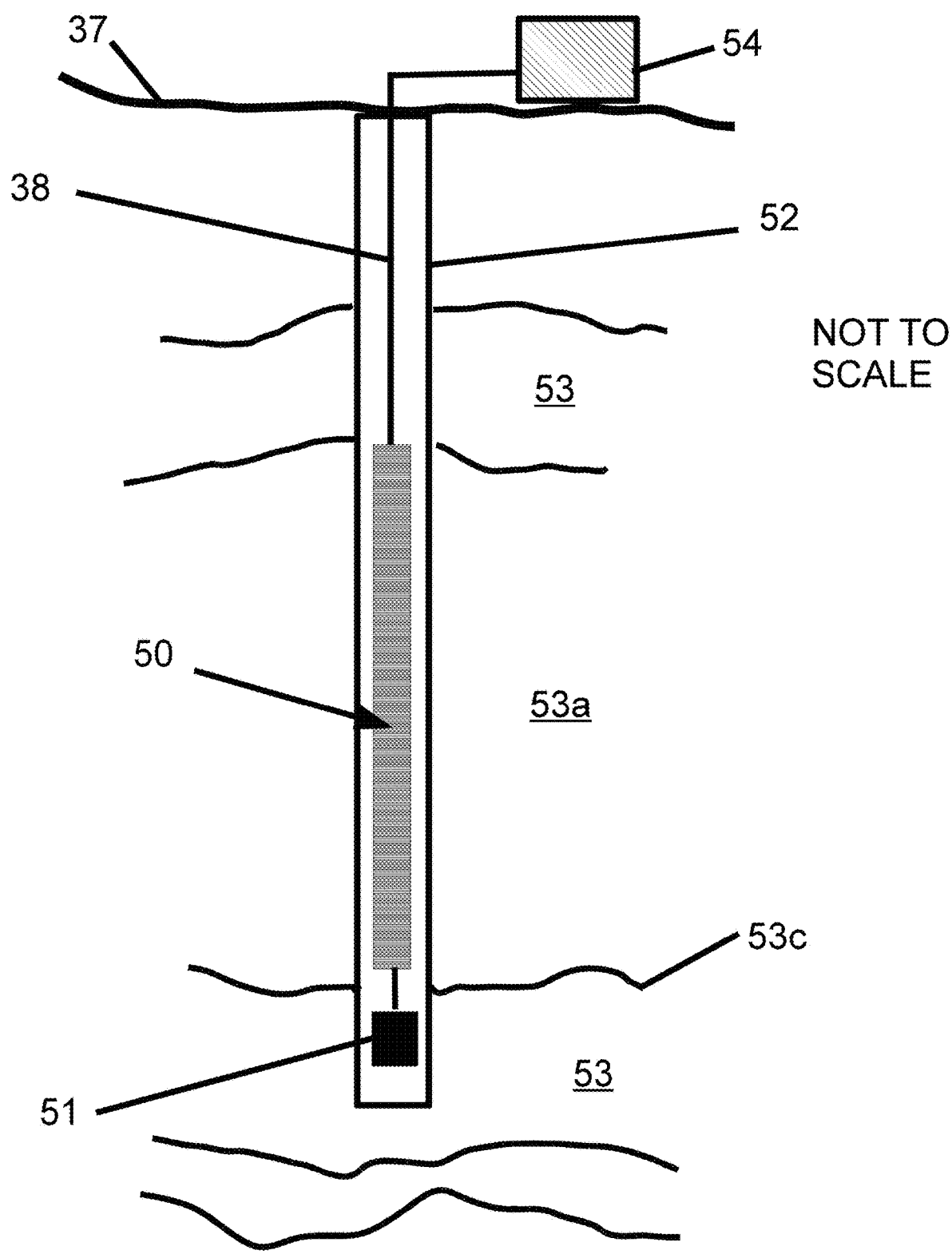
FIG. 1A (Prior Art) illustrates a prior art technology that was developed in the 1950s to allow the thermal recovery of heavy crude oils by heating the underground formations using a downhole heater system.

With regard to the reference numerals used, the following reference numerals are used throughout the various drawing figures.

28 workover oilfield rig 28
29 well cellar 29
30 cold cap 30
31a vitrified soil 31a
31b vitrified soil and waste 31b
31c vitrified waste 31c
31d vitrified waste 31d
31e cooled solidified melt material 31e
32 soil and melt interface 32
33 soil 33
34 off-gas 34
34a leading edge of off-gas migrating in formation 34a
34b off-gas accumulating at top of cavern 34b
34c off-gas volumes migrated into formation 34c
35 electrode 35
36 off-gas vent 36
37 ground surface 37
38 power cable 38
39 wellbore 39
40 melter 40
41 melter support 41
42 storage container for melt 42
43 calciner system 43
43a feeder for waste material to calciner 43a
44 melt in storage container 44
45 melt outflow 45
50 heater device 50
50a heater device centralizer 50a
51 weight device below heater 51
52 wellbore 52
52a steel casing 52a
53 unheated underground formations 53
53a heated underground formations adjacent to heater 53a
53b boundary facies change between underground formations 53b
53c unheated underground formations 53c (deep geological [rock] formation 53)
53d unheated "tight" underground formations 53d
54 power supply 54
60 human-made subterranean cavern 60
61 top of human-made subterranean cavern 61
62 melt and formation interface 62
63 downhole sealing packer system 63
64 heater vane/mixer 64
65 direction of upward motion for heater 65
66 direction of downward motion for heater 66
67 mixing flow lines of melt 67
301 insulation blanket material 301
200 prior art vitrification process 200
201 collect waste 201
203 separate HLW and LLW products 203
205 two stage vitrification 205
207 calcination process 207
209 one stage vitrification 209
211 vitrification process 211
213 simple POT vitrification process 213
215 storage & disposal of vitrification process 215
500 method of in-situ vitrification of waste in deep underground caverns 500
501 step of preprocessing and modeling of/for the intended vitrification process 501
502 step of forming wellbore and human-made cavern 502
503 step of preparing the waste and frit 503
504 step of installing downhole heater system 504
505 step of introducing the waste mixture into human-made cavern 505
506 step of installing cold cap above waste mixture 506
507 step of installing the packer seal device in wellbore 507
508 step of activating heating of the heater system 508
509 step of melting the melt mixture 509
510 step of venting off-gas to surrounding porous and permeable formation rock 510
511 step of continued heating/melting per predetermined temperature-time profile 511
512 step of reciprocating heater up and down within melt mixture 512
513 step of removing heater from melt mixture while still liquid 513
514 step of leaving the heater in place in melt mixture 514
515 step of cooling melt mixture to a final temperature 515
516 step of removing seal packer and power cable system 516
517 step of making decision to re-run vitrification operations 517
518 step of stopping operations 518
700 heater systems 700
701 heater 701
711 heater energizer 711
713 resistive energizer 713
715 inductive energizer 715
717 electromagnetic energizer 717
721 heater architecture 721
723 single element 723
725 multiple elements 725
727 stacked 727
729 unstacked 729
731 heater usage type 731
733 single use heater 733
735 reusable heater 735
737 disposable heater 737

739 non-disposable heater 739

DETAILED DESCRIPTION OF THE INVENTION

As noted above, embodiments of the present invention may describe means, systems, mechanisms, and methods for the in-situ vitrification of nuclear, radioactive materials (waste) and/or other waste products within human-made subterranean cavities (caverns) within deep geological formations. In some embodiments, sequential operations of the vitrification process may be implemented (see e.g., FIG. 3B through FIG. 3D and see FIG. 5).

In some embodiments, an operational method for nuclear waste disposal may be described. Such operational methods may provide more efficient methodology to allow safer, more economical, and long-lasting disposal of the nuclear waste in the deep underground human-made caverns as compared against prior art methods.

An existing consideration should be addressed for long-term nuclear waste disposal. That is the migration of radioactive material away from a given human-made cavern system, which in turn may contaminate ground water if not addressed. Some mechanisms are needed to minimize this possibility. A long-lived technology system is required to guarantee within scientific certainty that the nuclear waste can be contained adjacent to and within the human-made caverns zones. Vitrification is considered to be at least one such method to guarantee such desired containment.

In some embodiments, a means may be utilized that may provide for very long-lived protection from the migration of radioactive material away from the given human-made cavern.

In this patent application, the terms "radioactive material," "radioactive waste," "nuclear material," "nuclear waste," and "high-level nuclear waste" may be used interchangeably herein. In addition, the term "waste" generally means nuclear or radioactive waste of any kind. However, the embodiments described herein are not limited to radioactive waste, but may be applied to other forms of non-radioactive (hazardous) wastes.

In this patent application, the terms "cavern," and "cavity" may be used interchangeably with a same meaning. Further, "cavern" or "cavity" as used herein may mean a cavern/cavity that may be human-made (e.g., via under reaming operations).

In this patent application, "formation," "zone," "rock," and/or "rock medium" may be used interchangeably; and may refer to a rock structure within a deep geological formation (e.g., thousands of feet below the terrestrial surface) that may be hosting (housing) one or more human-made caverns.

In this patent application, the terms "well" and "wellbore" may be used interchangeably and may refer to cylindrical drilled out elements implemented in design and/or installation processes of some embodiments of the present invention. The term "wellbore packer," "packer," "wellbore seal," and/or "HYDRIL," may be used interchangeably to mean a sealing device or system to seal the internal bore of a given wellbore.

In this patent application, the terms "single well" or "common well" may refer to a wellbore that may be shared.

In this patent application, the term "ream" and "underream" may be used interchangeably to mean the enlarging of a wellbore or hole in a rock medium (wherein such continued enlargement may be used to form a given human-made cavern).

In this patent application, vitrified soil 31a, vitrified soil and waste 31b, vitrified waste 31c, and/or vitrified waste 31d may refer to: waste products to be vitrified (e.g., immediately before vitrification), liquified products (liquified products by vitrification), cooled solidified products, combinations thereof, and/or the like. The "a," "b," "c," and "d" designations of reference numeral "31" may refer to that different materials may be the subject of vitrification processes. Vitrified waste 31e may refer to cooled and substantially solidified vitrified waste 31d. Additionally, "melt" may replace terminology of "vitrified soil," "vitrified soil and waste," "vitrified waste," and/or "vitrified product."

In this patent application, "vertical wellbores" need not be geometrically perfectly vertical (parallel) with respect to the Earth's gravitational field; but rather may be substantially (mostly) vertical (e.g., more vertical than horizontal with respect to Earth's terrestrial surface 37).

FIG. 1A illustrates a prior art technology that was developed in 1950s and is still operational today (2020) to allow the thermal recovery of heavy crude oils by heating the underground oil-bearing formations using a downhole heater system 50. Shown in FIG. 1A is a means whereby an underground formation 53 sometimes referred as a "pay" zone, saturated with high viscosity crude, may be heated via a downhole heater 50. In these prior embodiments, massive amounts of heat energy may be delivered to a rock formation 53a from terrestrial surface 37 to decrease oil viscosity by several orders of magnitude providing flowability of the crude. The thermal delivery system may include a power supply 54 with the necessary controllers and a power cable system 38. The power supply cable system 38 is safely and routinely disposed within a vertical wellbore 52. This prior art technology provided a durable heater system 50 which worked for decades in severe oilfield operational conditions to mobilize viscous crude and produce this now mobile hydrocarbon from heated deep formations 53a via vertical wellbores 52.

This combination of elements shown in FIG. 1A may be modified to provide some elements that are discussed in several embodiments of the current invention. Extending these embodiments to the current invention is one of the objectives of the current vitrification processes for waste disposal in deep underground human-made cavities 60.

Figure 1B:
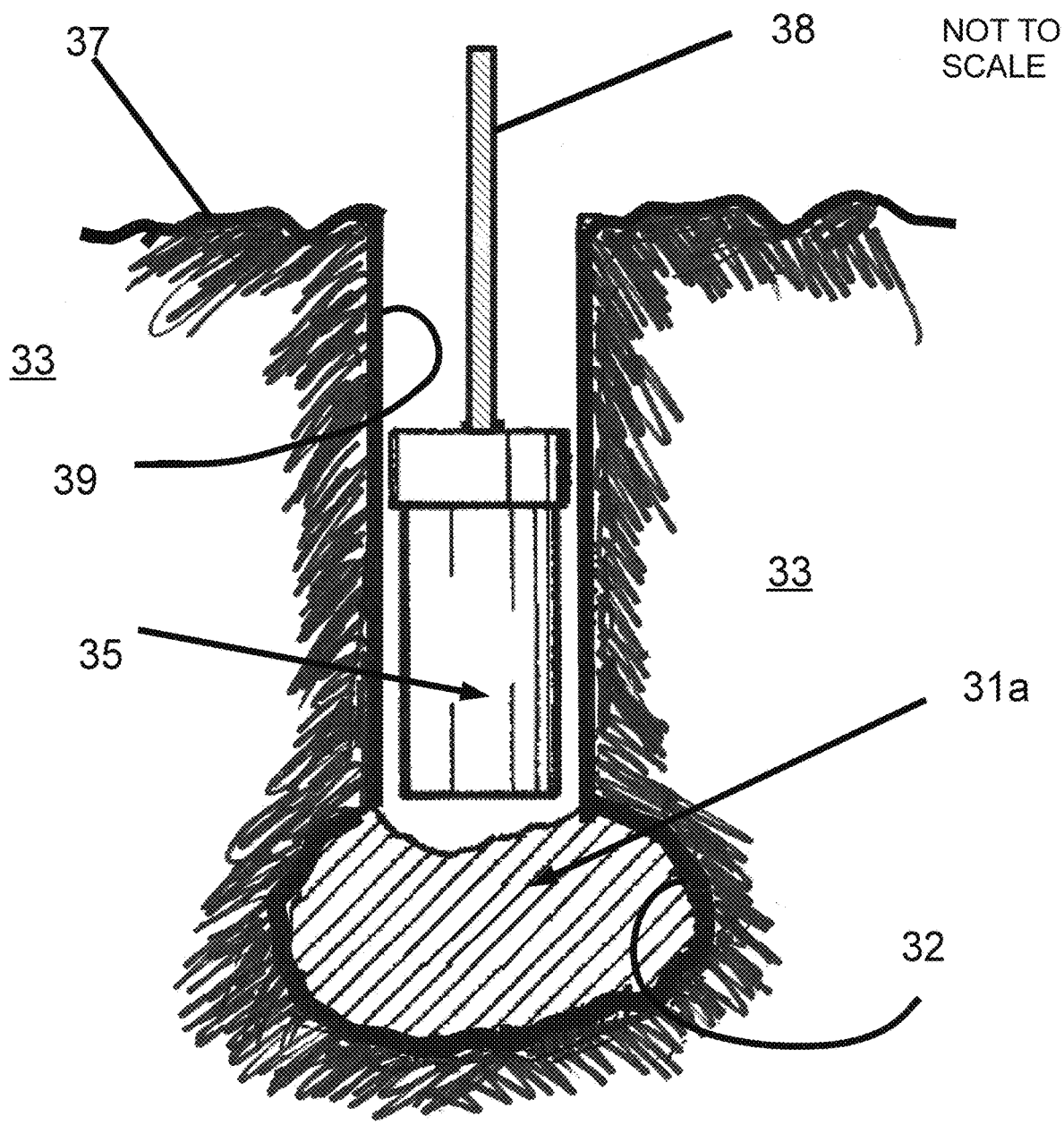
FIG. 1B (Prior Art) illustrates a prior art technology that was developed to implement construction pilings by vitrifying the near surface soil region in a shallow borehole using an electric heater system.

FIG. 1B illustrates a construction example in the prior art which utilized the application of vitrification processes for secure ground pilings. Shown in FIG. 1B is a region of soil 33 into which a borehole 39 is formed. The prior art system includes a power cable 38 for supplying electrical power to heating electrode 35. The electrode 35 is lowered into the borehole 39 until it is adjacent to the bottom of the borehole 39. The electrode 35 is energized to vitrify adjacent soil 33 at or near the bottom of the borehole 39 forming a vitrified soil 31a. The electrode 35 may be vertically raised within the borehole 39 during formation of the vitrified soil 31a in order to increase and extend the vertical extent of the vitrified soil 31a. After the vitrified soil 31a has been formed at or near the bottom of the borehole 39, the electrode 35 may be removed from the borehole 39. Now borehole 39 with its vitrified surroundings is ready to accept a piling.

However, in the subject invention, the vitrification process may be implemented not near surface 37 in normally unconsolidated soils 33 but rather in deep generally consolidated rock formations 53.

It is contemplated that elements of the prior art shown in this FIG. 1B may be significantly modified and improved to provide a new approach to in-situ vitrification of waste materials.

Figure 1C:
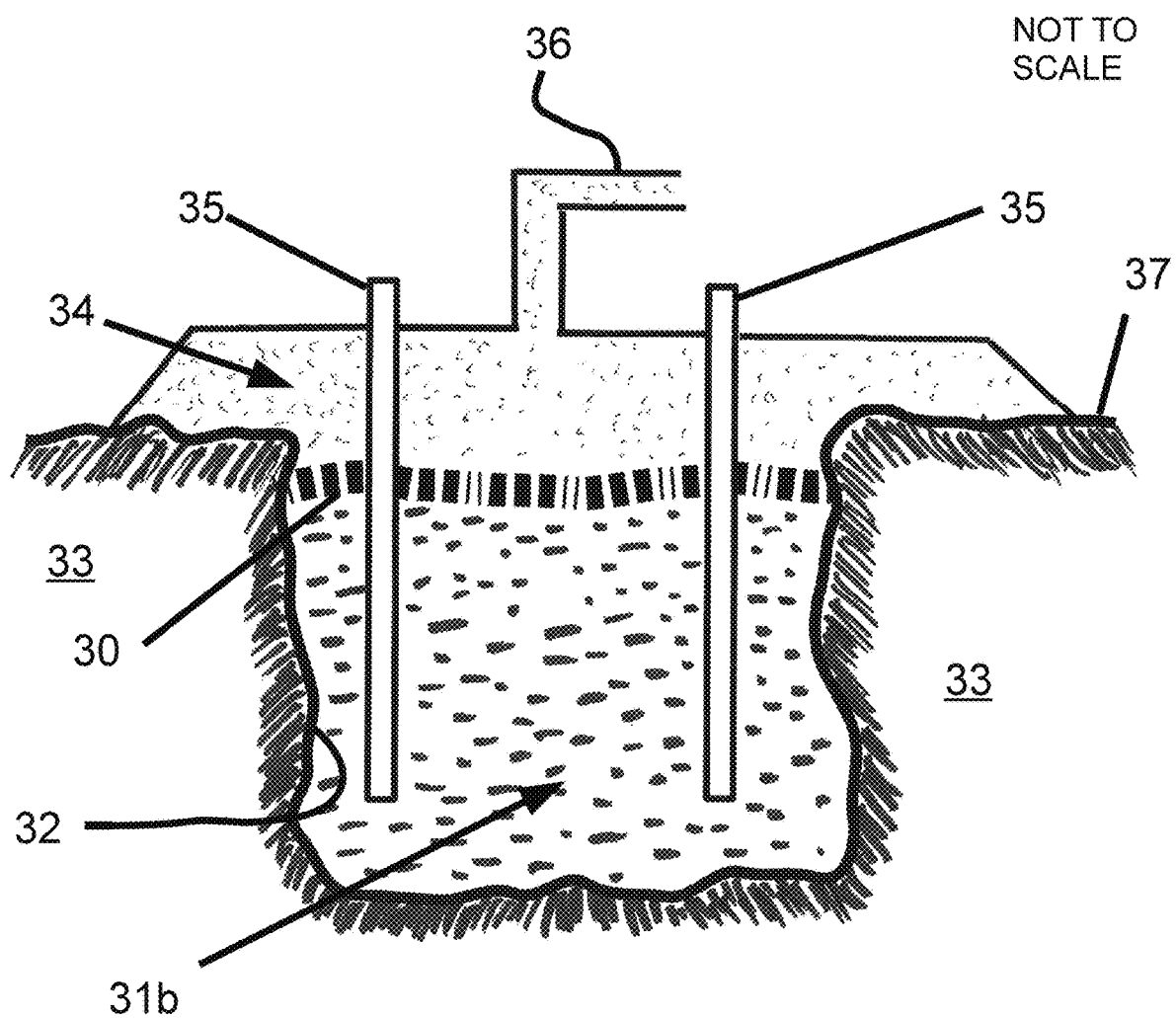
FIG. 1C (Prior Art) illustrates a prior art technology that was developed to treat contaminated soil in the near surface (shallow) region by vitrifying the soil using an electric heater system.

FIG. 1C illustrates a prior art technology that was developed by the USDoE (US Department of Energy) for in-situ joule heating to convert near surface contaminated soils and wastes to a glass product or a crystalline product (vitrified soil and waste 31b). In FIG. 1C, graphite electrodes 35 may provide electrical energy which heats up and liquefies the soil-waste mixture yielding vitrified soil and waste 31b. Vitrified soil and waste 31b may be heated up to 2,000 degrees Celsius. Pyrolysis products produced in the melting process migrate vertically upwards and the off-gas may be collected by a hood then vented through off-gas vent 36. A cold cap 30 resides above the vitrified soil and waste 31b and allows the off-gas and other products to migrate upwards vertically and be vented through off-gas vent 36.

Continuing FIG. 1C, the off-gas 34 produced may be a major problem which requires major processing subsystems for treatment of this off-gas 34 product. This additional requirement for off-gas 34 treatment is not needed in the operations of the current invention. It is contemplated that in the current inventive process that off-gas 34 is allowed to migrate into the upper gas zone of the subterranean cavern 34c (off-gas volumes migrated into formation 34c) where the off-gas 34 may remain captured in rock formations 53. See e.g., FIG. 3A.

In practice, the prior art technology taught in FIG. 1C was limited to a maximum depth of 19 feet—which is too restrictive. Further, the longest operating time period may be less than 200 hours—which is too restrictive. Under the published operating conditions and parameters, the total maximum throughput of waste is between 50 tons to 500 tons waste processed—which is too restrictive.

It is contemplated that elements of the prior art shown in this FIG. 1C may be significantly modified and improved to provide a new approach to in-situ vitrification of waste material by providing methods and systems that treat significantly larger volumes of waste products for a longer period of time in a manner which allows for significant reduction in the millions of gallons of waste material that are now stored on terrestrial surface 37. In addition, this inventive process may leave the vitrified waste 31d in a safe deep underground location 53 while the off-gas 34 produced may be disposed in the pore spaces of these porous deep underground formations forming a secondary gas cap 34c (off-gas volumes migrated into formation 34c).

Figure 1D:
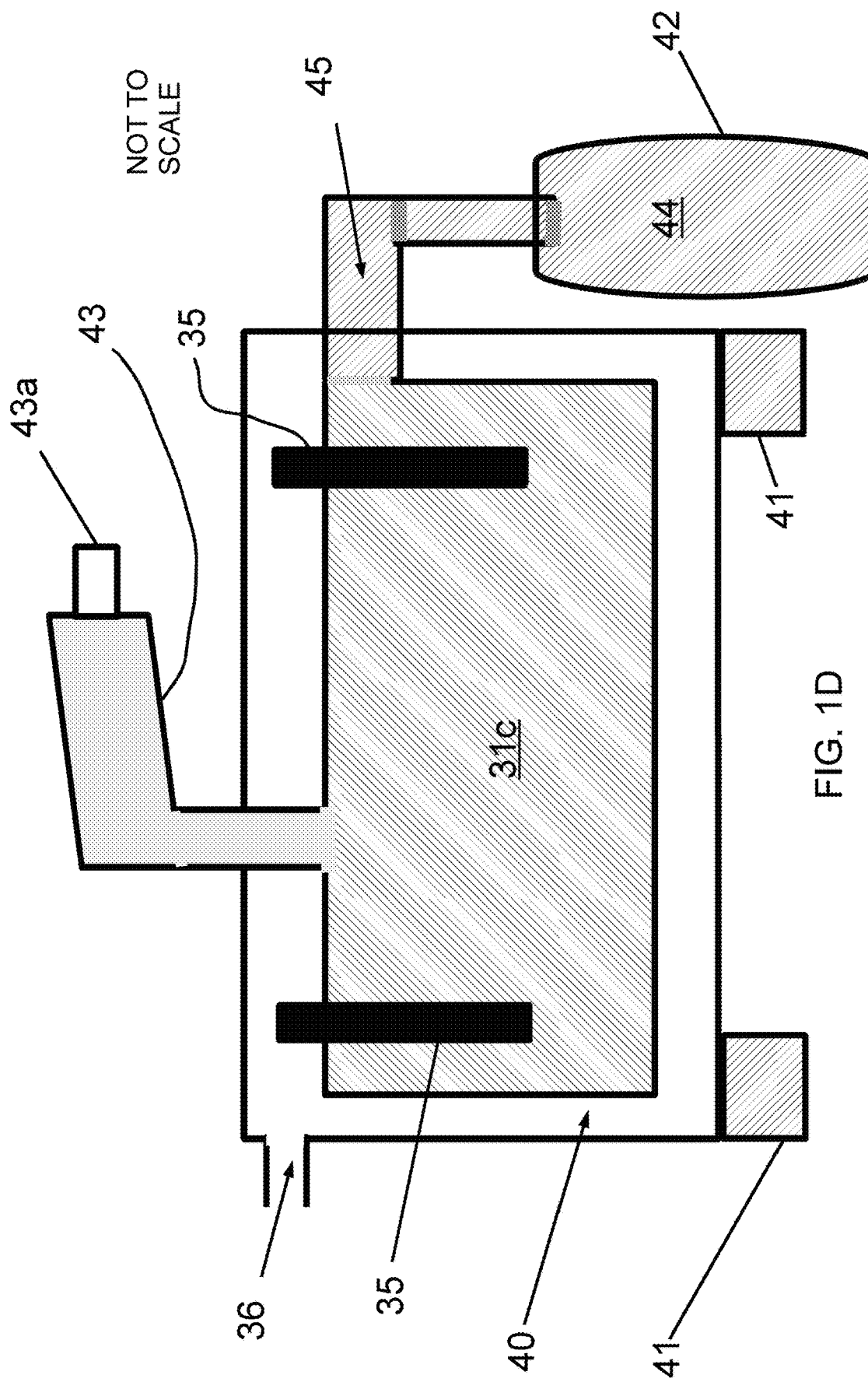
FIG. 1D (Prior Art) illustrates a prior art technology that was developed to implement by vitrification of nuclear waste in a melter using the joule heating ceramic method.

FIG. 1D illustrates a well-developed example in the prior art which utilized the application of vitrification processes in industry. FIG. 1D utilizes a process called Joule Heated Ceramic Melter ("JHCM") system, developed in the US, Germany, and several other countries. In this JHCM process, the waste material is melted in a ceramic lined container 40, on the terrestrial surface 37 location, yielding vitrified waste 31c. The untreated (pre-vitrified) waste product is added to the ceramic lined container 40 via a feeder for waste material to calciner 43a that leads into calciner 43, which leads into the main body/portion of the ceramic lined container 40. In FIG. 1D vitrified waste 31c is initially produced within the ceramic lined container 40, wherein this ceramic lined container 40 is only of a few feet in size. And ceramic lined container 40 is located on terrestrial surface 37.

However, in the subject invention, the vitrification process may be implemented, not in a limited container that is a few feet in size, but in a massive system, in a much larger underground human-made cavity 60, of industrial size proportions of hundreds of feet in length and up to 84 inches or so in diameter (in some embodiments). See e.g., FIG. 3A and FIG. 8.

It is contemplated that elements of the prior art shown in this FIG. 1D may be significantly modified and improved to provide a new approach to in-situ vitrification of waste material. In the current application, a heater system 50 may be implemented using variations of design such that the inherent convective behavior of the heated liquid melt material provides for convective mixing of the vitrified waste 31d and thus heat transfer within the cavity system 60 more efficient.

Figure 2:
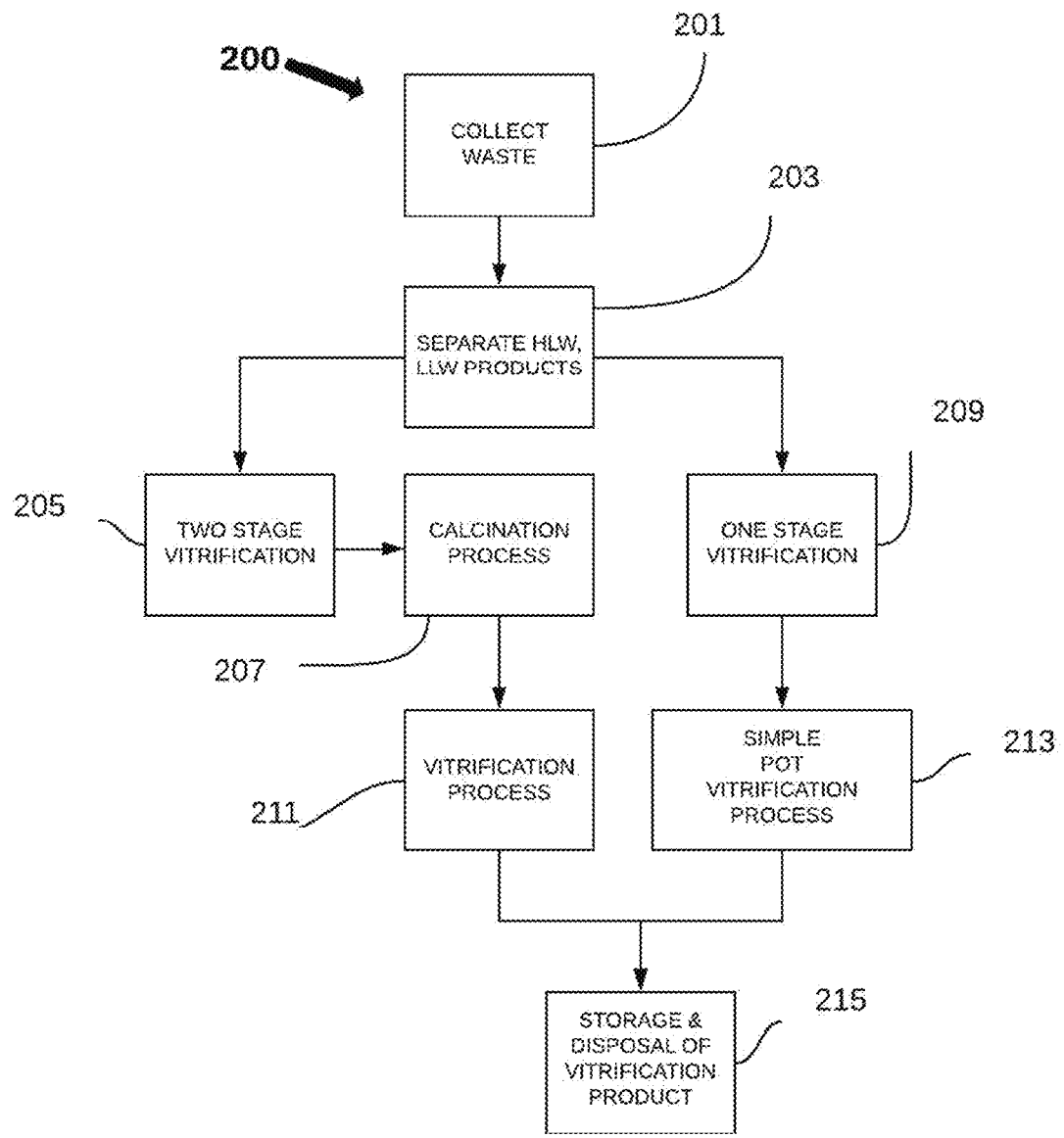
FIG. 2 (Prior Art) is a flow chart depicting methods and summary steps generally used in the prior art techniques.

FIG. 2 is a flow chart depicting methods and steps generally used in the prior art techniques. It is an objective of the proposed invention to improve upon these prior art techniques. FIG. 2 may depict steps in prior art method 200. Method 200 may teach methods that have been utilized to implement the vitrification processes for nuclear waste products. The following steps characterize method 200: step 201, step 203, step 205, step 207, step 209, step 211, step 213, and step 215.

Continuing discussing FIG. 2, step 201 is a step of collecting radioactive waste from multiple locations. Step 201 flows into step 203. Step 203 is a step of separating HLW (high level waste) products from LLW (low level waste) products. In practice step 203 may involve multiple processes to accomplish this separation. Step 203 is a very expensive, time consuming, and dangerous; in which radioactive elements can create additional safety concern for workers and the environment.

Continuing discussing FIG. 2, a decision has to be made after step 203 to proceed in a direct single step process or a sequential two-step process. Step 203 flows into step 205 or into step 209. Step 205 is a two-stage process for vitrification. Step 205 flows into step 207. Step 207 is a calcination process in which the waste is calcined or dried prior to vitrification. Step 207 flows into step 211. Step 211 implements vitrification of a calcined product from step 207. Step 211 flow into step 215.

Continuing discussing FIG. 2, step 209 is a single stage process for vitrification. Step 209 flows into step 213. Step 213 implements the original nuclear waste material directly in a single step in what is generally termed "pot" verification. Step 213 flows into step 215.

Continuing discussing FIG. 2, step 215 involves storing the vitrified products in steel canisters or other means for ultimate disposal at a later date, usually in a deep underground system. Yucca Mountain is a typical indication of where this final disposal waste may occur. Other waste disposal operations such a deep lateral wellbores have been provided in prior art as well as deep underground cavern systems.

Steps 201 through step 213 occur above ground, upon terrestrial surface 37.

The problems that may occur with the aforementioned steps of vitrification are several fold, some of these problems may be enumerated below.

First, a costly system of above ground infrastructure is needed to be constructed with a multiplicity of melters to achieve the vitrification process of method 200.

Second, these surface operations are costly and intensively manpower demanding. For example, at Hanford, Wash., in the US today (2020) there are more than 8,368 people working on the disposal problems. Current estimates on the vitrification and other associated costs for the Hanford, Wash., disposal are estimated at $37 Billion.

Third, published sources indicate that the techniques of method 200 have not all been tested and as such there is no guarantee that the complex "first of a kind" technology contemplated would even function as designed given the large differences of composition of the waste material.

Fourth, the feed compositions of the nuclear waste varies considerably. These variations create problems in design simulation of the process using Computational Fluid Dynamics (CFD) means. The net result is that on a daily basis, the input feed may vary. This means that there is a constant change in the operating compositions and there are ongoing requirements to "fine tune" the complex physical-chemical operating conditions in near real time. In contrast to this type operation, the in-situ vitrification taught in the present application in deep underground caverns is less demanding and more fault tolerant of variations in input waste feeds.

Fifth, the operating melting temperatures for vitrification may be in the range of 1,150 degrees Celsius or more. Controlling such massive amounts of heat in and at surface 37 operations is often problematic and dangerous. Such high temperatures may not create a problem in a human-made cavern 60 of the deep underground vitrification system process because the human-made cavern 60 is surrounded by significant and substantial walls of consolidated rock matrix on all sides, i.e., the earth itself, functioning as a massive heat sink, which allows the excess heat energy to be conducted safely away in all directions by the solid rock matrix material in the formation 53 from the human-made cavern 60 are located. In the embodiments taught in this invention, it is noted that these human-made cavern(s) 60 may be implemented between 2,000 to 20,000 feet below the surface 37 of the earth. The human-made cavern(s) 60 are essentially in fully surrounded and buried in solid consolidated rock 53. The typical melter in the prior art does not have such a massive physical mass of surrounding heat sink material, capable of "absorbing" a very high heat load generated during the vitrification process.

Sixth, another serious limiting factor in the prior art technology during operation may be the destructive corrosive effects of certain waste constituents on the physical structure of the melter itself. Under the operating conditions in the melter, the destructive problems are encountered because the corrosive nature of the vitrified waste 31c may degrade the physical structure of the melter significantly requiring the need for expensive, elaborate, replaceable, noncorrosive melter systems to remedy this potential problem.

The embodiments taught in the subject inventive means do not require these special features. The present invention using deep underground human-made caverns 60 in rock formations 53, is able to withstand the corrosive activities since the human-made cavern 60 has wall thicknesses that extend radially (horizontally) in the formations 53 up to several miles. Any corrosion or physical erosion of the walls of the human-made cavern 60 may be minimally deleterious to the surrounding formation rock 53. Rock formations 53 are by definition very expansive. The formation 53 are vertically and horizontally thick and extend more than necessary in three dimensions.

Seventh, insoluble materials are usually present in waste melt materials of vitrified waste 31c during the vitrification process. In the prior art methods, in practice, the quantity of insoluble materials present may limit the waste loading of the vitrified waste 31c and thus degrade the overall efficiency of the vitrification process. Also, these insoluble materials may settle out of the vitrified waste 31c thus affecting the melter efficiency and operation and in some cases curtail the melter operation. The embodiments taught in this invention may allow insoluble materials to segregate toward the bottom of the given human-made cavity 60 and accumulate in a location where upon, continued vitrification can occur above these insoluble precipitates. The embodiments taught in this invention may be more tolerant of problems that may occur in the prior art approaches to the vitrification process and may therefore allow vitrification to occur over a wide range of hitherto before, limiting conditions.

Eighth, the off-gas 34 that is produced in these prior art approaches has to be safely treated and disposed of at the site of vitrification (e.g., on surface 37) and this may be problematic. It is well known that certain off-gases 34 may be produced under operating conditions in the vitrification process. The embodiments taught in this inventive system may define a means whereby the off-gases 34 migrate or bubble upwards from the vitrified product 31d and into a zone above the vitrified product 31d to form an off-gas zone 34b (off-gas accumulating at top of cavern 34b) inside the human-made cavern 60. This off-gas 34 is prevented from migrating up the vertical wellbore 52 by the packer system 63 (downhole sealing packer system 63) inside the wellbore 52 and also in addition by the fact that the wellbore 52 may have casing which is firmly cemented annularly to the rock formations 53 that extend from the human-made cavern 60 location all the way to the terrestrial surface 37. There is no escape route for off-gas 34 to the terrestrial surface 37 in some embodiments of the present invention. The off-gas 34 may further migrate out of the human-made cavern 60 into the formation rock 53 forming what is called in the industry a gas cap region 34c (off-gas volumes migrated into formation 34c). This gas cap 34c (off-gas volumes migrated into formation 34c) may extend for large distances laterally (horizontally) and with proper design and selection of the stratigraphic location of the given human-made cavern 60, within the given deep geological formation 53, these off-gases 34 may be trapped in the given deep geological formation 53 for time periods measured in geologic time scales (e.g., on the order of for thousands of years or more); similar to natural gas reservoirs in rock formation that have trapped hydrocarbon gases, essentially methane, for millions of years.

Ninth, in the prior art, because of the tremendous costs associated with prior art vitrification processes, typically only one vitrification "project" proceeds at a given time— which is grossly below the demand. Whereas, in the proposed invention, a plurality of deep human-made cavern 60 systems, undergoing in-situ vitrification as described herein, may literally "dot" the landscape operating simultaneously with a minimal level of staffing. This mode of operation may be analogous to the development operations in a new oilfield where dozens of drilling operations with separate ongoing drill rigs occur simultaneously. In these embodiments, it is contemplated that less than 10 people (workers) for each in-situ vitrification site is required to "man" and operate a disposal project of this type.

There is a long-felt need to limit or eliminate the effects of these above noted problems and their shortcomings.

It is contemplated that elements and steps of the prior art shown in this FIG. 2 may be significantly modified and improved to provide a new approach to in-situ vitrification of vitrified waste 31d by: (a) providing more robust methods and systems that treat significantly larger volumes of vitrified waste 31d; (b) providing for a longer period of vitrification operating time; (c) vitrifying waste products of less stringent compositions, i.e., wider compositional variations of waste and glass formers; (d) allowing more heterogeneity in the physical mixture of vitrified waste 31d; and (e) in manners which allow for significant reduction in the millions of gallons of waste material that are now stored on the surface 37.

In addition, under the embodiments taught in this inventive process at the end of the proposed vitrification process the embodiments of this inventive process may leave the vitrified waste 31d in a safe deep underground location, i.e., deep geological formation 53, while the off-gases 34 produced may be disposed in the pore spaces of these deep underground formations 53 forming a secondary gas cap 34c and the solid vitreous mass of radioactive waste (vitrified waste 31d) is encased in deep geological formation 53, which is the essential definition of a deep geological repository as advocated and anticipated by all governing agencies worldwide as the ideal means for the ultimate disposal of this radioactive waste product.

The novel features which are considered characteristic for various embodiments of the invention are set forth in the appended claims. Embodiments of the invention itself, however, both as to its construction and its methods of operation, together with additional objects and advantages thereof, will be best understood from the following description of the specific embodiments when read and understood in connection with the accompanying drawings. Attention is called to the fact, however, that the drawings are illustrative only, and that changes may be made in the specific construction illustrated and described within the scope of the appended claims. In addition, certain elements may be omitted from certain drawings to enhance clarity without detracting from the meaning or the idea taught in the drawing.

These and other advantages and features of the present invention are described herein with specificity so as to make the present invention understandable to one of ordinary skill in the art, both with respect to how to practice the present invention and how to make the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Figure 3A:
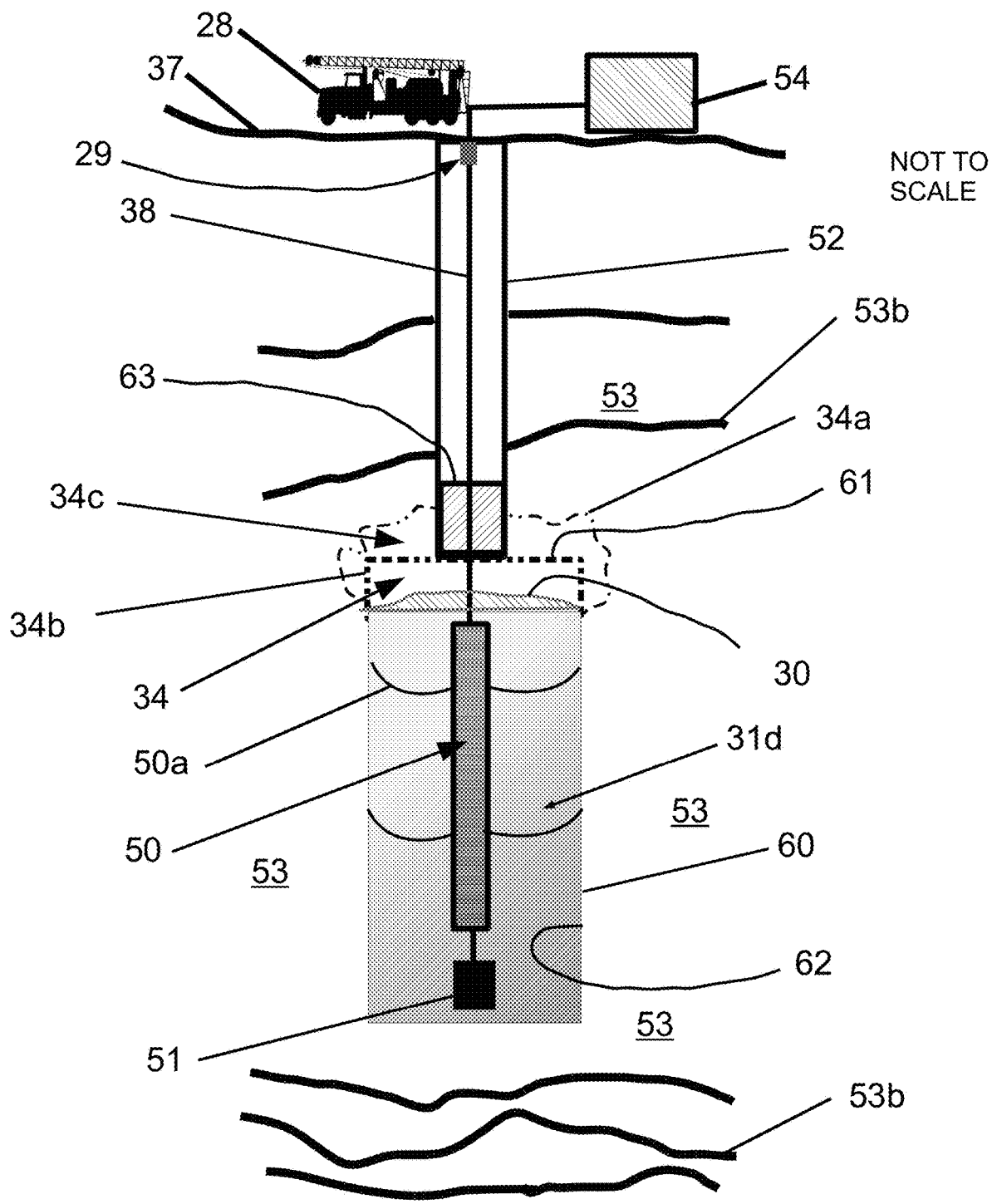
FIG. 3A may depict a generalized overview of various elements included in some embodiments of the present invention. Elements shown may be on the terrestrial surface, in the wellbore section and in the deep underground cavern section.

FIG. 3A may illustrate a general overview of a vitrification system contemplated herein. FIG. 3A may illustrate a general overview of a deep geologic nuclear waste disposal system and/or process implemented in deep human-made cavern(s) 60 and using vitrification. FIG. 3A may be a schematic (cross-sectional side view) showing an overview of contemplated inventive means, systems, mechanisms, and/or methods for the in-situ vitrification of radioactive materials within a human-made subterranean cavern(s) 60 within a deep geological formation 53; showing a vertical wellbore 52 system which is drilled from the terrestrial surface 37 and cased (lined) with steel casing 52a, and at least one human-made cavern 60 disposed of in a deep rock formation 53 with melt materials 31d (vitrified product 31d) placed in or disposed of inside of the at least one human-made cavern 60. In some embodiments, at least one human-cavern 60 may be located entirely within deep geological formation 53. See e.g., FIG. 3A (and FIG. 3G).

In some embodiments, the selected deep geologic formation 53 (or host rock) may be igneous, metamorphic, sedimentary type formations or structural combinations of two or more of these three rock types. The selected host rock 53 may have desirable and required properties to contain vitrified radioactive waste material 31d (vitrified product 31d) over (geologically) long time intervals and may be able to minimize migration away from the human-made caverns 60. In some embodiments, some of required properties of rock formation 53 may be demonstrated by petrophysical analysis.

Continuing discussing FIG. 3A, in some embodiments, at least one wellbore 52 may run at least from terrestrial surface 37 of the Earth to the at least one human-made cavern 60. In some embodiments, the at least one wellbore 52 may terminate in the at least one human-made cavern 60. In some embodiments, the at least one wellbore 52 may be at least two thousand (2,000) feet long before the at least one wellbore 52 runs into the at least one human-made cavern 60. In some embodiments, a diameter of the at least one wellbore 52 is less than a diameter of the at least one human-made cavern 60. In some embodiments, a majority of an interior of at least one wellbore 52 may be lined with a substantially cylindrical casing 52a. In some embodiments, the substantially cylindrical casing may be steel casing 52a. See e.g., FIG. 3A (and FIG. 3G).

Continuing discussing FIG. 3A, in some embodiments, below the vertical wellbore 52, a human-made caverns 60, is reamed out below the vertical wellbore section 52 using under-reaming equipment readily available today (2020) in the oil-well and drilling services industries.

In some embodiments, the deep geological formation 53 may be located at least two thousand feet (2,000) below a terrestrial surface 37 of the Earth. In some embodiments, deep geological formation 53 (also known as the host rock 53) may be located substantially from about 2,000 feet to about 30,000 feet below earth's surface 37, plus or minus 1,000 feet. In some embodiments, human-made cavern 60 may have a diameter from 30 inches to 120 inches, plus or minus 6 inches. In some embodiments, human-made cavern 60 may have a height or vertical length of 100 feet to 10,000 feet plus or minus 50 feet.

In some embodiments, deep geological formation 53 may have geologic properties that make storing nuclear waste materials within deep geological formation 53 relatively safe and desirable. For example, and without limiting the scope of the present invention, in some embodiments, deep geological formation 53 may have one or more of the following geologic properties: structural closure, stratigraphically varied, low porosity, low permeability, low water saturation, and reasonable clay content. Shown in FIG. 3A, are the geological discontinuities 53b (boundaries 53b) between formation (zones) facies 53. In some embodiments, it may be desirable to locate, create, form, and/or build one or more human-made cavern(s) 60 within deep geological formation 53. In some embodiments, nuclear waste 31d (vitrified product 31d) may include HLW, LLW, depleted uranium products, UF6, uranium products, combinations thereof, and/or the like.

Continuing discussing FIG. 3A, in some embodiments, associated usually, but sometimes at remote locations, may be an electric power supply system 54. In some embodiments, the electric power may be supplied by gas or diesel generators, solar power, geothermal, wind, battery, regional power grid distribution system, combinations thereof, and/or the like. In some embodiments, the power supply 54 may be connected to a regional power grid distribution system. In some embodiments, at least one power supply 54 may be configured for supplying the at least one heater 50 with electrical power.

Continuing discussing FIG. 3A, in some embodiments, the power supply 54 may be connected to a downhole heater system 50 via power supply cable system 38 (i.e., at least one cable 38) which is implemented inside the casing 52a of the vertical wellbore 52. Attached below the heater device 50 may be one or more weight(s) 51 which provides continuous tension loading to the power supply cable 38 and heater system 50. In some embodiments, this weight device 51 maintains the power cable system 38 always in tension to ensure proper operations in much the same way as "sinker rods" used in pumping operations in sucker rod oil well pumping field operations keep sucker rods in tension. In some embodiments, at least one heater 50 may be disposed within the at least one human-cavern 60. In some embodiments, the at least one heater 50 may be configured to melt the hazardous waste 31d received into the at least one human-cavern 60 into substantially a liquid 31d; wherein upon the liquid cooling below a predetermined temperature the liquid forms a vitrified glass (waste product) 31d.

Continuing discussing FIG. 3A, in some embodiments, at least one weighted device 51 may be attached to the at least one heater 50. In some embodiments, the at least one weighted device 51 may be configured to maintain the at least one heater 50 in a substantially vertically oriented position with an overall length of the at least one heater 50 substantially parallel with respect to an imaginary longitudinal axis running substantially vertically of the at least one human-made cavern 60. In some embodiments, the at least one weighted device 51 may be of a predetermined weight. See e.g., FIG. 3A (and FIG. 3G).

Continuing discussing FIG. 3A, in some embodiments, at least one power supply 54 may be located proximate (e.g., above ground 37 and/or below ground 37, but not far [deep] below ground 37) to terrestrial surface 37 of the Earth. In some embodiments, the at least one cable 38 may run from the at least one power supply 54 to the at least one heater 50. In some embodiments, the at least one cable 38 may connect the at least one power supply 54 to the at least one heater 50. In some embodiments, the at least one cable 38 may be attached to the at least one power supply 54 and to the at least one heater 50. In some embodiments, the at least one cable 38 may be configured to provide the electrical power from the at least one power supply 54 to the at least one heater 50. In some embodiments, the at least one cable 38 may be configured to allow remote control of the at least one heater 50 from at or proximate to surface 37. In some embodiments, the at least one cable 38 may be configured to support a weight of the at least one heater 50. In some embodiments, the at least one cable 38 may be configured to support the weights of one or more of: at least one heater 50, centralizers 50a, weighted device 51, mixing vanes 64, combinations thereof, and/or the like. See e.g., FIG. 3A (and FIG. 3G).

Continuing discussing FIG. 3A, in some embodiments, a wellbore packer or sealing device 63 is implemented inside the casing 52a of the vertical wellbore 52. In some embodiments, this packer or sealing device 63 may be located at or near the bottom of the vertical wellbore 52, or at any desired or suitable position along the vertical length of the wellbore 52. In some embodiments, this packer or sealing device 63 may be implemented with a "HYDRIL" type packing system, well known to those in the oil-filed industry, which can seal around the power cable 38 and any irregular object and thus prevent off-gases 34 or liquids from travelling vertically up the wellbore 52 and reaching terrestrial surface 37. In some embodiments, this packer or sealing device 63 may be designed with an internal sliding mechanism which allows the power cable 38 to be reciprocated through the packer or sealing device 63 and provide vertical travel of up to three (3) feet or more while still sealing the wellbore 52 from off-gases 34 or liquids flowing vertically upwards.

Continuing discussing FIG. 3A, in some embodiments, at least one sealing packer system 63 may be disposed within the at least one wellbore 52 and located closer to the at least one human-made cavern 60 than to the terrestrial surface 37 of the Earth. In some embodiments, the at least one downhole sealing packer system 63 may be configured to seal off the at least one wellbore 52 from the at least one human-made cavern 60 (e.g., sealing off with respect to off-gas 34 and/or liquids/waste products 31d within the at least one human-made cavern 60). See e.g., FIG. 3A (and FIG. 3G). In some embodiments, the at least one downhole sealing packer system 63 may be removed from the at least one wellbore 52.

FIG. 3A (and FIG. 3G) may show a workover rig 28. In some embodiments, a given workover rig 28 may be a truck-mounted and modified oilfield rig system which is generally used to carryout smaller operations in the field. In some embodiments, these field operations may not need the massive capacity of a full-blown drilling rig and the workover rig 28 may perform these routine operations like packer 63 setting, coiled tubing operations, winch operations, downhole tool insertions (and removals), well logging, combinations thereof, and/or the like. In such scenarios use of a workover rig 28 may be quicker and cheaper than use of the full-blown drilling rig. In some embodiments, workover rig 28 may be used to install and/or remove: heater 50 devices, packers 63, weighted devices 51, mixing vanes 64, cold caps 30, thermal insulating blankets 301, hazardous waste 31d to be vitrified, other downhole tools/sensors, other downhole operations as needed, combinations thereof, and/or the like. Also shown in FIG. 3A (and in FIG. 3G) is a well cellar 29 which may be a dug-out area, lined with cement and/or very large diameter thin-wall pipe, located below the given rig (e.g., workover rig 28). In some embodiments, a given well cellar 29 may serve as a working cavity below the earth surface 37 level.

In some embodiments, workover rig 28 may be full-blown drilling rig.

Continuing discussing FIG. 3A, the melt 31d (vitrified product 31d) is the principal material which contains the nuclear waste product which is to be vitrified according to this inventive method. In some embodiments, the composition of the melt 31d (vitrified product 31d) may be defined and determined in advance, by exhaustive chemical and physical analysis to meet and to satisfy the final requirements of the vitrified glass product (vitrified product 31d). In addition, in some embodiments, certain predetermined glass forming agents, precursor chemicals and modifying additives may be added to the melt mixture 31d (vitrified product 31d) before vitrification to enhance vitrification. To those skilled in the art these analyses are available and customary in the glass making industry. In some embodiments, the calculated quantity of melt material 31d (vitrified product 31d before vitrification) may be poured, pumped, and/or delivered into the given human-made cavern 60 from the surface 37 through the wellbore 52. The melt material 31d (vitrified product 31d), prior to vitrification, which may be in aggregate, slurry, powder, granular form, combinations thereof, and/or the like, is generally free-flowing in nature, and may accumulate inside of the given human-made cavern 60 and around the heater device 50 therein, surrounding and covering the heater device 50 and its centralizers 50a and reaching a calculated and/or predetermined height within that given human-made cavern 60.

Continuing discussing FIG. 3A, in some embodiments, at least one centralizer 50a may be located within at least one human-made cavern 60 and disposed around at least a portion of the at least one heater 50. In some embodiments, the at least one centralizer 50a may be configured to maintain the at least one heater 50 in a center of the at least one human-made cavern 60. In some embodiments, the center of the at least one human-made cavern 60 lies on an imaginary longitudinal axis of the at least one human-made cavern 60. See e.g., FIG. 3A (and FIG. 3G.)

Prior art vitrification processes have "batch processed" relatively small volumes of melt 31c. In one example, a Direct Liquid Fed Ceramic Melt system with melter dimensions of 1.22 meter×0.86 meter×0.71 meter produced about 25 kg (kilograms) of melt 31c per hour. The volumetric capacity of this melter was estimated at 744 liters of melt 31c. Whereas, the embodiments contemplated in this invention, based on the projected deep underground human-made cavern 60 dimensions, may provide for melt 31d volumes significantly greater, by orders of magnitude, than prior art levels. Based on the projected dimensions of a given underground human-made cavern 60, the systems taught herein by this invention may process between 20,000 liters to 500,000 liters of melt 31d per underground human-made cavern 60.

This melt processing may occur over a matter of days depending on the heater 50 capacity and electric energy deliverability from the surface 37. By comparison, a Russian process discussed in the prior art, produced 160 tons melt 31c over an 18-month period. There is a great need for a system which can process the very large volumes of high level waste (HLW) that is present worldwide today (2020).

Continuing discussing FIG. 3A, in some embodiments a cold cap system 30 (at least one cold cap 30) may be placed above the melt material 31d that is disposed within the given human-made cavern 60. In some embodiments, the at least one cold cap 30 may be located on top of the at least one human-made cavern 60. In some embodiments, the at least one cold cap 30 may be located immediately above a given layer of hazardous waste 31d within the at least one human-made cavern 60. In some embodiments, the at least one cold cap 30 and insulation blanket material 301 may be used interchangeably herein. In some embodiments, the at least one cold cap 30 may be configured to function as a heat sink, such that when the at least one heater 50 is generating heat, temperatures below the at least one cold cap 30 are higher than temperatures above and proximate to the at least one cold cap 30. In some embodiments this cold cap 30 which resides above the melt material 31d, behaves as a blanket through which gas and vapors can move vertically from the liquid melt material 31d in the given human-made cavern 60 during the vitrification process. In some embodiments, the at least one cold cap 30 may be permeable to off-gas 34. It has been demonstrated in the prior art, that there is significant decrease in the temperature profile from the melt material 31d and its products residing at the bottom region of the melt 31d to the gas cap region 34b that may exist above a top of the given human-made cavern 60 (or above cold cap 30). In one particular prior art dataset, a temperature range is reported from a high of 1,100 degrees Celsius within the melt 31c, to about 100 degrees Celsius at the top of a cold cap layer. This range of temperature may be expected in a similar manner in the vitrification process occurring within the given human-made cavern 60 of the present invention. It may be necessary in some processes, to heat the melt 31d as high as 1,600 degrees Celsius to complete the vitrification process.

In some embodiments, the composition and properties of the cold cap 30 may be determined by analysis and preplanning before the cold cap 30 is disposed of in the wellbore 52, and into a top region of the given human-made cavern 60 above the melt material 31d. In some embodiments, a given cold cap 30 may be a desired element for the proper operation of the vitrification process in the given human-made cavern 60.

Continuing discussing FIG. 3A, in some embodiments an off-gas zone 34b may occur during the vitrification process above the cold cap 30. This void space or zone 34b is normally free of solid material. In some embodiments, this zone 34b may be filled with at least some of off-gas 34 because the off-gas 34 that is produced during vitrification process and is being vented from the melt 31d as its constituents are heated and vitrified in the given human-made cavern 60 directly below this zone 34b. In some embodiments, this off-gas 34 may accumulate at the top of and/or above the given human-made cavern 60 forming the off-gas chamber or zone 34b because of the density differences between the off-gas 34 and the liquid melt 31d. As the off-gas 34 may accumulate at the top of and/or above the given human-made cavern 60 this off-gas 34 may migrate out of the top of that given human-made cavern 60 and into the pore spaces of the rock formations 53 around and immediately above that given human-made cavern 60.

It is well known in the art that sedimentary rocks 53 have varying porosities and permeabilities, even igneous rocks have fracture porosity and permeability, and as such the off-gas 34 may migrate into these zones (e.g., immediately above the given human-made cavern 60) some distance to form a gas cap region 34a. Such gas caps may accommodate large volumes of gas (e.g., off-gas 34). For example, and by comparison in oil fields, natural gas caps normally contain many millions of cubic feet of natural gas, thus the gas zone delineated by the leading edge 34a of the off-gas 34 migrating into the formations 53 may accommodate a significant amount of off-gas 34 produced during the melt 31d vitrification process within that given human-made cavern 60. The deep underground formation 53 may thus provide a secure disposal for the off-gases 34, some of which may later condense and remain trapped as condensate in the pore spaces of the rock formations 53. This storage of the off-gas 34 within portions of the deep geological formation 53 is a major accomplishment of the new invention.

Figure 4:
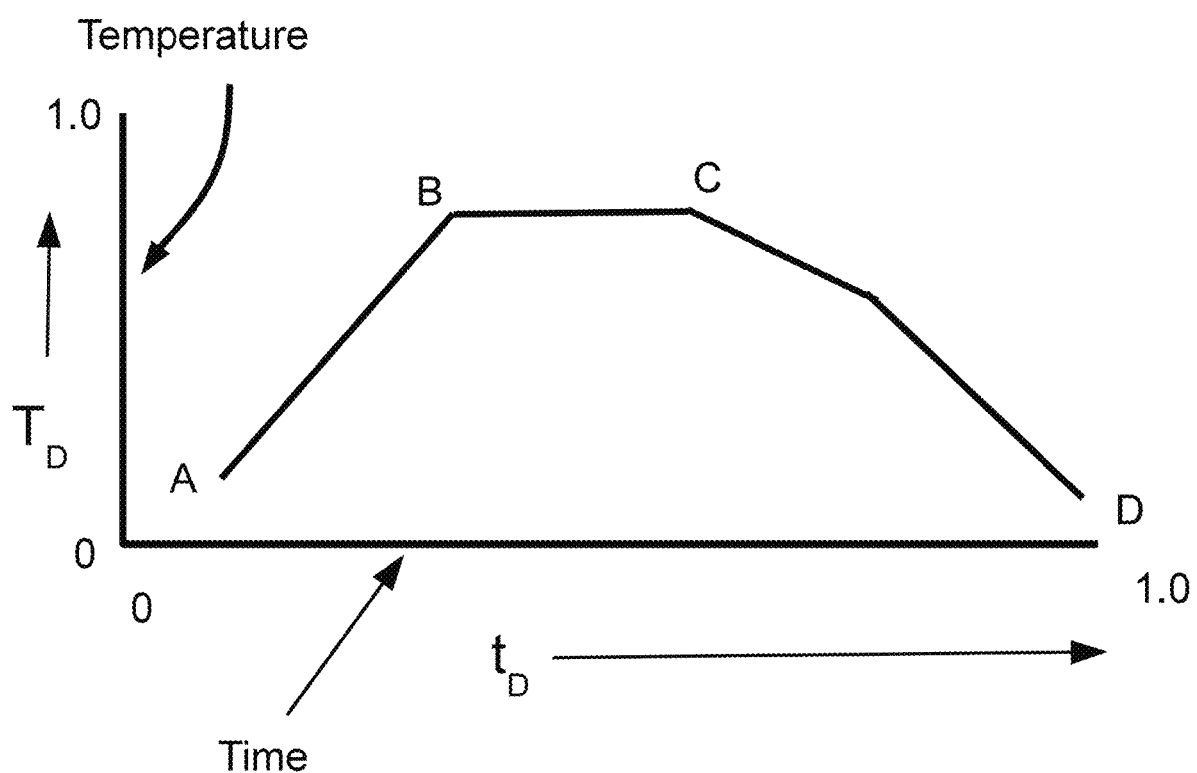
FIG. 4 may illustrate an example of the temperature-time graph of the heating and cooling process cycle implemented in this application to allow the annealing process for the vitrified melt in a cooling phase.

FIG. 3B, FIG. 3C, and FIG. 3D may illustrate a sequence of operations in which the vitrification of multiple discrete quantities or batches of melt 31d are completed in sequential succession in the same deep geological human-made cavern 60 via the same wellbore 52. In this embodiment, as shown in FIG. 3B, the heater 50 and cable system 38 are disposed at or near the bottom of the given human-made cavern 60, a calculated and/or predetermined volume or batch of melt 31d (before being melted) is introduced into that given human-made cavern 60 from the surface 37 using wellhead equipment and wellbore 52, to at least partially cover over heater device 50. The cold cap 30 is put in place above the melt mixture 31d and the wellbore packer system 63 is then installed above that that given human-made cavern 60. The heat system 50 is energized and the vitrification of the then present melt 31d is completed by an initial heating cycle, followed by cooling cycle i.e., decreased heat input, according to the temperature/time profiles type as shown in FIG. 4 and which profile is selected for the specific melt mixture 31d in that human-made cavern 60. After cooling to a pre-determined temperature, of this initial batch of melt 31d, the heater 50, may be removed from that batch of cooling melt 31*d*, if the heater 50 is non-disposable; whereas, if the heater 50 is disposable, then the heater 50 is left in the melt 31*d* permanently as that melt 31*d* cools and solidifies.

The cable system 38 and packer system 63 are removed and a layer of protective material 301 is disposed above the cooled vitreous glass melt 31*e* from the surface 37 via the wellbore 52. Melt 31*e* (or vitrified waste 31*e*) may denote waste product that has been vitrified and has cooled sufficiently to at least substantially solidify. In some embodiments, at least one insulation blanket material 301 may be disposed between two layers of the hazardous waste 31*d*/31*e* within the at least one human-made cavern 60. In some embodiments, the at least one insulation blanket material 301 may be configured to substantially thermally isolate the two layers of the hazardous waste 31*d*/31*e* from each other. Continuing with FIG. 3C, a heater 50 and cable system 38 may be re-installed into that given human-made cavern 60. This could be a new disposable heater 50, or a re-installation of the original and reusable heater 50. Above the protective layer 301, a calculated and/or predetermined volume or batch of new/additional melt mixture 31*d* (before melting) is introduced into that given human-made cavern 60 from the surface 37 via wellbore 52. Another cold cap 30 is emplaced above that newly added melt mixture 31*d* and a packer seal system 63 is re-installed (installed) in the wellbore 52 above that given human-made cavern 60. Then the heater system 50 is energized and the vitrification process is initiated again, i.e., that newly added melt 31*d* is liquified by heater 50. The cable system 38 and packer system 63 are removed and a new layer of protective material 301 is disposed above the most recent cooled vitreous glass melt 31*e* by using the wellbore 52 from surface 37.

In FIG. 3D a similar process is repeated; i.e., a heater 50 and cable system 38 may be re-installed into that given human-made cavern 60; then additional/new melt 31*d* (before melting) is added to that given human-made cavern 60; another cold cap 30 is emplaced above the last added melt mixture 31*d* and a packer seal system 63 is re-installed (installed) in the wellbore 52 above that given human-made cavern 60; then the heater system 50 is energized and the vitrification process is initiated again; heating is stopped; some cooling occurs; a new protective layer 301 is installed over the last vitrified waste 31*d*; and so on, until that given human-made cavern 60 is filled to a desired and/or predetermined level with vitrified waste 31*d*. Multiple sequences of this process can be cycled through until that given human-made cavern 60 is filled to a prescribed height (volume) with vitrified waste 31*d*. Thus, while FIG. 3B, FIG. 3C, and FIG. 3D show portions of three sequential vitrification rounds, additional sequences may occur.

Figure 3E:
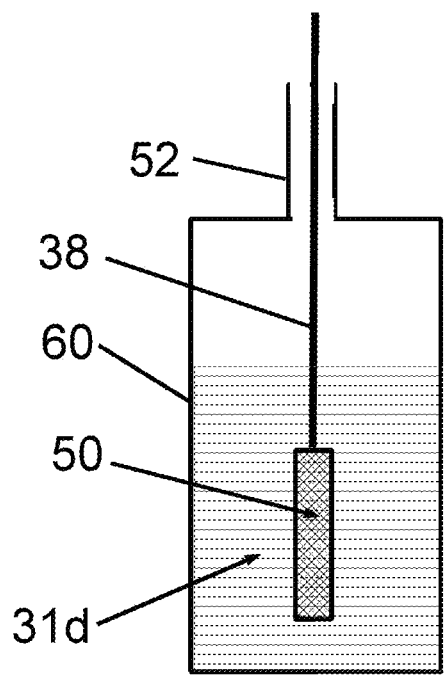
FIG. 3E may depict a generalized overview of a single element form of downhole heater constructed with at least one heating element.
Figure 3F:
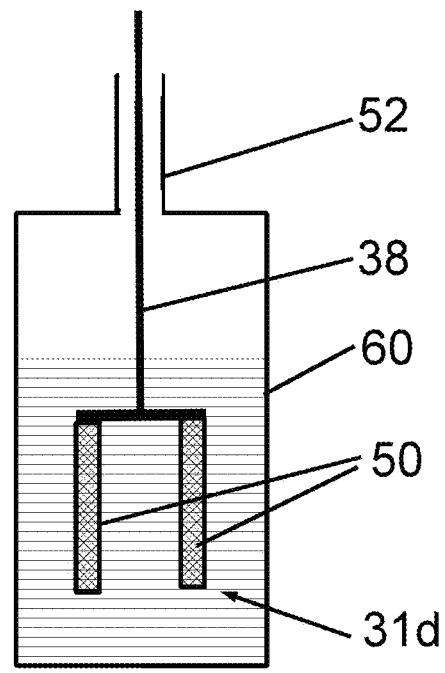
FIG. 3F may depict a generalized overview of a multi-element forms of downhole heater constructed with multiple heating elements.

FIG. 3E and FIG. 3F may illustrate heater 50 system types and are discussed more fully later in the section dealing with FIG. 7 wherein varieties of heaters are illustrated. FIG. 3E may show at least one main heater 50 being used in the vitrification process; whereas, FIG. 3E may show at least two main heaters 50, arranged in parallel, being used in the vitrification process.

Figure 3G:
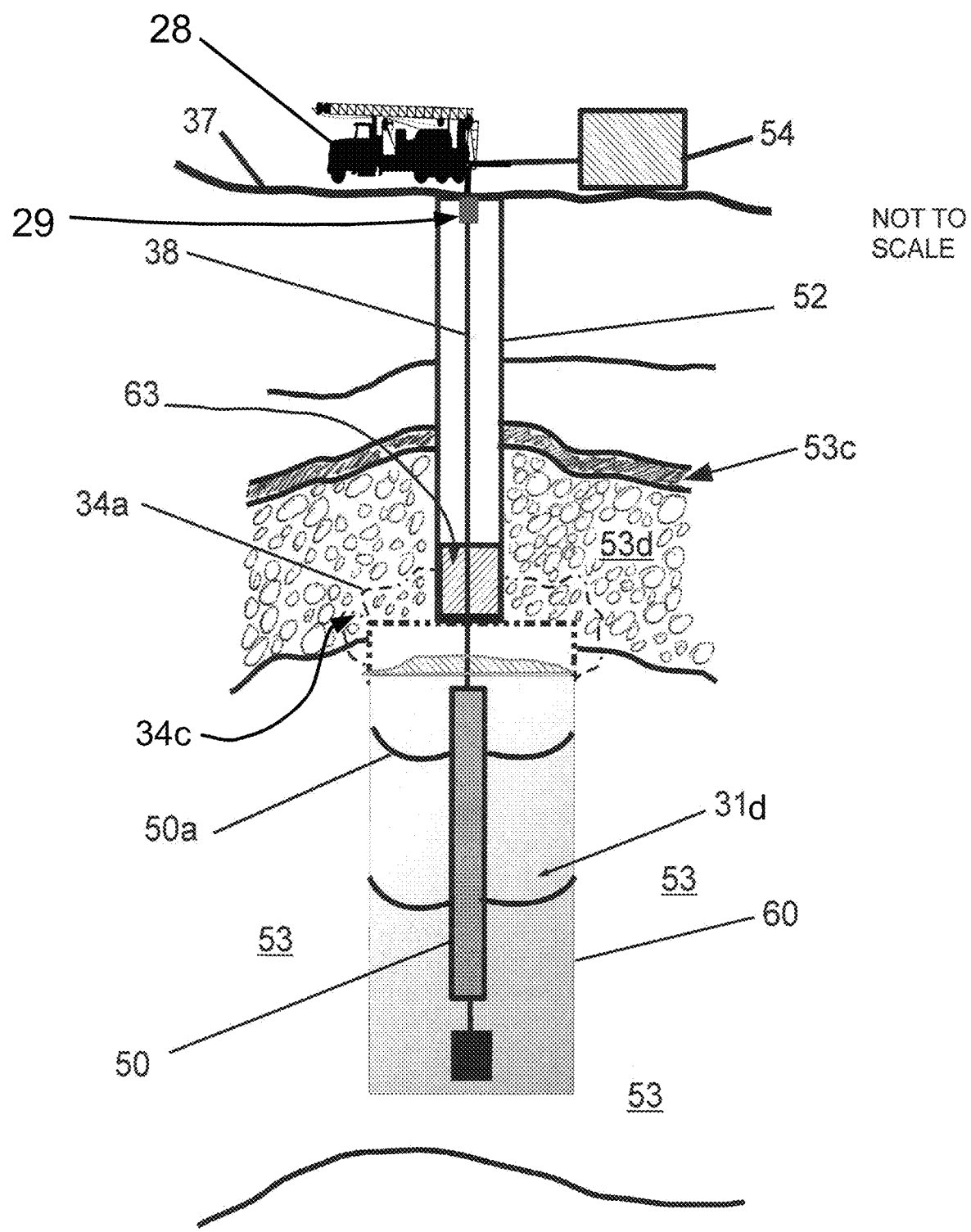
FIG. 3G may depict a close-up cross-section view of a gas cap zone developing in zones generally above the human-made subterranean cavern as a result of vitrification processes.

FIG. 3G may illustrate an embodiment of the invention which shows development and subsequent utilization of a gas cap region 34*c* to contain the off-gas 34 produced in the vitrification process in the given human-made cavern 60. In the vitrification process, the off-gas 34 is heated and thus pressurized above the melt 31*d* (vitrification products 31*d*) since the off-gas 34 is prevented from escaping via the wellbore 52 by the wellbore seal 63. In some embodiments, this off-gas 34 a path available which is to migrate into and remain inside the porous zones of rock 53*d* ("tight" underground formations 53*d*) above and proximate to the given human-made cavern 60.

Continuing discussing FIG. 3G, in this embodiment of the invention, it is contemplated that the underground human-made cavern 60 may be implemented in a specified (and predetermined) deep geologic formation 53 (or region 53) such that a gas cap region 34*c* may be structurally available above the formation 53 in which the human-made cavern 60 is reamed out from.

Today (2020) current geophysical exploration techniques allow for very precise definition and location of such prospective underground zones 53 (deep geologic formation 53) with potential gas cap formation zone(s) 53*d* ("tight" underground formations 53*d*) to accommodate gas cap regions 34*c*. This technology is routinely done in oilfield work both onshore and offshore. It is contemplated in this embodiment that this gas cap formation zone 53*d* ("tight" underground formations 53*d*) may be permeable, porous, structurally closed and may be comprised of sandstones, conglomerates or combinations thereof, with the necessary overburden of a tight mostly impermeable zone 53*c* such as a shale or clay acting as an impermeable cap. This impermeable zone 53*c* would prevent the vertical (upwards) migration of the off-gas 34 from exiting gas cap formation zone 53*d*; i.e., gas cap region 34*c* would exist in gas cap formation zone 53*d*. An analogy operation to the gas cap migration into the zone 53*c*, is the re-injection of natural gas into deep closed porous sandstone reservoirs by the gas utilities to store their gas for later production and consumer use in the heating season.

Continuing discussing FIG. 3G, in such a geologic environment with a gas cap formation 53*d* structurally closed by a cap layer or formation 53*c*, the off-gas 34 may remain in place (in gas cap formation 53*d* as gas cap region 34*c*) for as long as several million years of geologic time just like a natural gas reservoir may have retained natural gas for millions of years in such underground formations.

FIG. 4 may be an illustration depicting the temperature of the melt mixture and time of heating relationship in a vitrification process. This graphic may be considered to be a heating and cooling curve. The curve shown in this FIG. 4 is shown as a curve with dimensionless variables. Those skilled in the art know that a dimensionless variable is unitless and is useful in modeling relationships among physical variables. The dimensionless variable value is independent of the dimensional system in which it is expressed.

Continuing discussing FIG. 4, it has been recognized that in the vitrification process it can be important for that glass melt to cool at controlled rates such that proper annealing occurs and that the glass end product of the vitrification does not undergo fracturing within the solid glass product which would severely degrade the long term performance of the formed glass because of the massive increase in surface areas because of internal fractures and the subsequent effect on leaching and other reactions over time period.

In some embodiments taught in this invention, a temperature/time profile for heating and cooling of the subject waste may be established as shown in FIG. 4 by computational analysis of the melt mixture 31*d* before undergoing the actual vitrification process. The temperature/time profile values may be displayed as dimensionless variables $T_D$ for temperature as shown in the vertical axis and $t_D$ for time as shown in the horizontal axis of FIG. 4.

As shown in the FIG. 4, the initial heating curve of A-B indicates the heat up of the melt 31*d* system. The levelized section B-C may indicate the time period of constant heating of the melt 31d inside the subject human-made cavern 60. The vitrification process may require a cool down process to enable annealing and this is illustrated by the cool-down section C-D. In some embodiments of the inventive process, the heat input into the melt 31d by the heater 50 may be controlled precisely by monitoring the electric power, current, and/or voltage, that is inputted to the downhole heater system 50. At the end of the heating cycle the electric power is shut off (or brought below a minimum threshold) (and the heater 50 may be removed while the melt is still liquid, in some embodiments). To relieve stresses (and mitigate undesired fractures), which can lead to breakage at room temperature, cooling of the resulting glass product (vitrified waste 31d) may occur in a controlled manner through a predetermined temperature gradient. This allows the surface and interior of vitrified waste 31d to cool substantially uniformly. This controlled process for cooling the glass (vitrified waste 31d) to relieve interior stresses is called annealing in this vitrification context.

Figure 5:
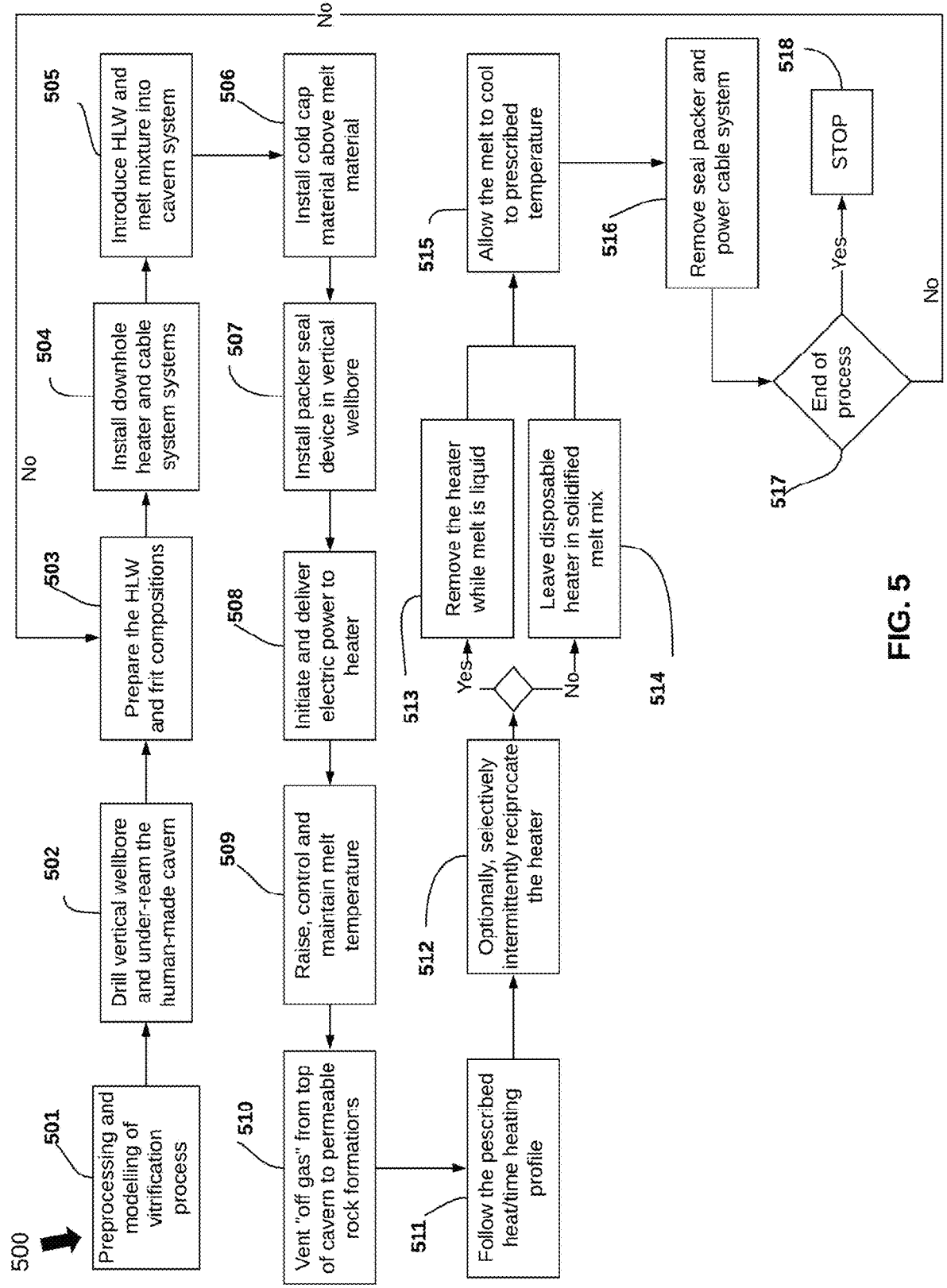
FIG. 5 may illustrate a flow chart of the subject application for the deep underground vitrification of waste in human-made subterranean cavern(s).

FIG. 5 may depict a flowchart of at least some steps in a method 500. In some embodiments, method 500 may be a method of in-situ vitrification of waste 31d in deep underground human-made caverns 60 located within deep geological formations 53. In some embodiments, sequential operations of the vitrification process may be implemented.

In some embodiments, method 500 may be a method showing operations involved in the downhole in-situ vitrification of waste products 31d, such as, but not limited to, HLW, LLW, depleted uranium, depleted uranium products, depleted uranium materials, nuclear waste, nuclear materials, radioactive waste, radioactive materials, non-nuclear waste, non-radioactive waste, hazardous waste, waste, combinations thereof, and/or the like.

In some embodiments, method 500 operations may be a method of in-situ vitrification as opposed to batch melter vitrification in which the prior art and current vitrification occurs in a physical vessel or crucible-like system at or near the surface 37.

In some embodiments, method 500 may comprise steps 501 to 518.

Continuing discussing FIG. 5, in some embodiments, step 501 may be a step of preprocessing and modeling of/for the intended vitrification process. In some embodiments, analysis and/or preprocessing of the waste melt material 31d may yield at least some operating parameters for the intended vitrification process. This analysis step 501 may be a comprehensive modelling operation in which CFD (computational fluid dynamic) and/or other means of analysis are utilized to provide parametric data such as time, temperature, energy input, compositions and/or other variables for optimizing the intended vitrification process. In some embodiments, step 501 may yield/produce a "roadmap" for the intended vitrification process in the deep human-made cavern 60. In some embodiments, step 501 may transition into step 502. In some embodiments, step 501 may be optional to method 500.

Continuing discussing FIG. 5, in some embodiments, step 502 may be a step of forming the substantially vertical wellbore 52 and then forming at least one human-made cavern 60 from a portion of that wellbore 52. In some embodiments, wellbore 52 may be drilled into a deep underground geological formation 53. In some embodiments, wellbore 52 may terminate in a deep underground geological formation 53. In some embodiments, at least one human-made cavern 60 may be located in the deep underground geological formation 53. In some embodiments, the substantially vertical wellbore 52 may be drilled from the terrestrial surface 37 and into the deep underground geological formation 53 with substantially conventional oil-well drilling equipment. At the completion of the substantially vertical wellbore 52 drilling operation, at least one human-made cavern 60 may be reamed out from/below the substantially vertical wellbore 52 using special "under-reaming" tools which are available in the oil and gas industry today. In some embodiments, wellbore 52 may be fitted with casing(s) 52a (e.g., steel casing(s) 52a, such as, steel piping). Some embodiments in this invention may include the cementing in the annular ring between casing 52a and the substantially vertical wellbore 52. This cement which is set by pumped circulation of cement slurries in the annular region between the steel casing 52a and the wellbore 52/earth interface. The cement completely and externally seals the wellbore 52 and prevents any fluid communication from the human-made cavern 60 upwards and laterally into the rock 53 surrounding the wellbore 52. This procedure is commonly referred to as cementing in the oil industry and is done successfully in several hundred thousand wells annually. In some embodiments, method 500 may begin with step 502. In some embodiments, step 502 may transition into step 503.

Continuing discussing FIG. 5, in some embodiments, step 503 may be a step of preparing the waste for vitrification treatment. This step 503 may be a broad and/or variable operation in which many different types of wastes may be routinely processed by a series of well accepted methods which have been tested over more than 50 years. At the end of this step 503 the waste may include glass formers and/or frit to form a mixture 31d which is ready for transferring down into the wellbore 52 and into the given human-made cavern 60. In some embodiments, the melt mixture 31d may be modified to provide a free flowing granular, slurry, powder, aggregate mixture, combinations thereof, and/or the like. In some embodiments, step 503 may transition into step 504. (In some embodiments, step 503 may be omitted, e.g., if the waste has already been prepared or is in a state ready for vitrification; in which case, step 502 may progress to step 504.)

Continuing discussing FIG. 5, in some embodiments, step 504 may be a step of installing at least one heater 50 system into the given human-made cavern 60, via wellbore 52, and from surface 37. In some embodiments, step 504 may also comprise installing/inserting the weighted device 51 downhole below and attached to at least one heater 50 system. In some embodiments, step 504 may also comprise installing/inserting downhole, the power cable 38 system that has a distal end that is attached to and powers the at least one heater 50 system. A proximal end of power cable 38 may be attached to one or more power supplies 54 located at or near surface 37. In some embodiments, step 504 may also comprise installing/inserting one or more centralizers 50a into the given human-made cavern 60 and around the at least one heater 50. In some embodiments, the one or more centralizers 50a may keep the at least one heater 50 substantially centrally located (e.g., with respect to a longitudinal axis) within the given human-made cavern 60. In some embodiments, centralizers 50a may be installed on the at least one heater 50 to allow the heater 50 to "standoff" from the human-made cavern 60 walls and be centralized in the melt 31d volume. Being centralized in the volume of the melt 31d may allow the heating process to be more uniformly effective in melting the waste material 31d. In some embodiments, the at least one heater 50 and the weighted device 51, one or more centralizers 50a, and at least portions of power cable 38 may be inserted into the given human-made cavern 60, via wellbore 52, from surface 37; wherein the given human-made cavern 60 is located in the deep geological formation 53. In some embodiments, step 504 may be accomplished using downhole service operations which are very well established in the oil-well servicing industries. These operations have been used in oil thermal recovery projects and in installing submersible high capacity downhole pumps that require high rates of electric power, with specialized cable systems and other known well servicing operations and equipment. In some embodiments, step 504 may transition into step 505.

Continuing discussing FIG. 5, in some embodiments, step 505 may be a step of introducing the product of step 503 (e.g., the prepared waste mixture) into the given human-made cavern 60, via wellbore 52, from surface 37; wherein the given human-made cavern 60 is located in the deep geological formation 53. In some embodiments, a predetermined amount (e.g., volume and/or mass) of the product of step 503 (e.g., the prepared waste mixture) may be introduced into the given human-made cavern 60 in step 505 (or each iteration of step 505). In some embodiments, step 505 may result in the filling the given human-made cavern 60 to a predetermined level/height. In some embodiments, the melt mixture 31d may now completely cover the at least one heater 50. In some embodiments, step 505 may transition into step 506.

Continuing discussing FIG. 5, in some embodiments, step 506 may be a step of installing the cold cap 30 above the melt mixture 31d. The cold cap 30 which is well known in the industry is a complex mixture of predetermined solid materials which maintains a blanket above the melt 31d during the vitrification process. In some embodiments, step 506 may transition into step 507.

Continuing discussing FIG. 5, in some embodiments, step 507 may be a step of installing the packer seal device 63 in the wellbore 52 by well-known oilfield practices which convey the packer seal device 63 to the wellbore 52 at pre-set (predetermined) levels within the wellbore 52. In some embodiments, a type of packer seal device 63 used may be a HYDRIL type (or the like) which is able to seal around regular or irregular shapes. Packers are designed for multiple types of uses in oil and gas work. Hundreds of types of packers are available in the industry today. In some embodiments, step 507 may transition into step 508.

Continuing discussing FIG. 5, in some embodiments, step 508 may be a step of activating (energizing) the at least one heater 50 that may be submerged within the melt mixture 31d, within the given human-made cavern 60. In some embodiments, step 508 may be accomplished in part by use of power cable 38 and power supply 54. In some embodiments, operation of the at least one heater 50 may be controlled from surface 37 via power cable 38. In some embodiments, step 508 may result in the at least one heater 50 emitting heat into the surrounding melt mixture 51d. In some embodiments, step 508 may transition into step 509.

Continuing discussing FIG. 5, in some embodiments, step 509 may be a step of melting the melt mixture 31d by the energized and heat emitting at least one heater 50. In some embodiments, in step 509 the heating/melting aspects of the vitrification process may be undertaken. In some embodiments, the downhole heater 50 system is energized and may be maintained, controllably, according to the pre-determined temperature-time profile illustrated in FIG. 4. In some embodiments, this operational profile may be followed in practice to control and/or maintain melt 31d temperatures such that optimal heating/cooling may occur to facilitate proper and complete glass formation and to then prevent subsequent fracturing of the cooling/cooled glass 31d. In some embodiments, step 509 may transition into step 510.

Continuing discussing FIG. 5, in some embodiments, step 510 may be a step of venting off-gas 34 into surrounding porous and permeable formation rock 53d forming off-gas cap 34c. In some embodiments, in step 510 the off-gas 34 (produced in step 509 and in step 511 from the melting of the melt mixture 31d) may be vented upwards through the given human-made cavern 60, through cold cap 30, and into surrounding porous and permeable formation rock 53d for long-term storage therein. In some embodiments, step 510 may transition into step 511.

Continuing discussing FIG. 5, in some embodiments, step 511 may be a step of continued heating/melting according to the predetermined temperature-time profile that is illustrated in FIG. 4. Off-gas 34 produced in step 511 may be vented according to step 510 noted above. In some embodiments, in step 511, the downhole heater 50 system may be energized and maintained controllably according to the predetermined temperature-time profile (predetermined heating and cooling profile) that is illustrated in FIG. 4. This predetermined temperature-time profile may be followed in practice to control, maintain melt 31d temperatures such that optimal heating/cooling may occur to prevent fracturing of the melt glass 31d on cooling suddenly. In some embodiments, during step 511 power to the at least one heater 50 may be modulated. In some embodiments, step 511 may extend for a relatively long time. For example, and without limiting the scope of the present invention, this relatively long time may be from ten (10) days to ninety (90) days per cycle/iteration of method 500 and/or step 511; whereas, in other embodiments, other (predetermined) time periods may be applicable for step 511. In some embodiments, step 511 may extend for a relatively long time depending on the results of the CFD models of the vitrification process (and/or the like) which predict the operating parameters and operations time for the at least one heater 50 to be in activated and operating. In some embodiments, step 511 may transition into step 512.

Continuing discussing FIG. 5, in some embodiments, step 512 may be a step of reciprocating the at least one heater 50 up and down within the melt mixture 31d. In some embodiments, reciprocating the at least one heater 50 up and down within the melt mixture 31d may introduce currents to the melt mixture 31d both by the movement of the at least one heater 50 and by convection from the heat emanating from the at least one heater 50. In some embodiments, these currents may aid in the mixing and/or melting process of the melt 31d, by facilitating uniform temperatures within the melt mixture 31d. In some embodiments, this up and down reciprocation may occur over a predetermined distance and over a predetermined pathway. For example, and without limiting the scope of the present invention, this predetermined distance may be three feet, plus or minus 6 inches; i.e., the at least one heater 50 may travel upwards three feet and then downwards three feet. In some embodiments, this up and down reciprocation may occur over a predetermined timeframe. For example, and without limiting the scope of the present invention, this predetermined timeframe may be for several minutes. In some embodiments, step 512 may transition into step 513; or step 512 may transition into step 514. In some embodiments, step 512 may be optional or omitted. In embodiments where step 512 may be omitted, step 511 may transition into step 513 or step 511 may transition into step 514.

Continuing discussing FIG. 5, in some embodiments, step 513 may be a step of removing the at least one heater 50 from the melted melt mixture 31d, while the melt mixture 31d is still in a substantially liquid phase. In some embodiments, the at least one heater 50 may be reusable. In some embodiments, the at least one heater 50 may pulled out (retrieved) from the given human-made cavern 60, from wellbore 52, and back to surface 37. In some embodiments, step 513 may operationally depend on a type of heater 50 used in the vitrification process. If the heater 50 is a non-disposable type, the downhole heater system 50 may be removed from the liquid melt 31d and returned to the surface 37 to be reused in later cycles of operations. The removal process is realized by the operations shown in step 516 of this method later in this discussion. If the heater 50 is disposable or sacrificial, step 514 is implemented after the cable 38 is retrieved. In some embodiments, step 513 may transition into step 515.

Continuing discussing FIG. 5, in some embodiments, step 514 may be a step of leaving the at least one heater 50 in the melt mixture 31d, and the melt mixture 31d will solidify around that the at least one heater 50. In step 514, the heater 50 may be left in the melt 31d as it solidifies and the heater 50 is embedded inside the cooled glass melt 31d. In some embodiments, the at least one heater 50 may be disposable and/or not reusable. In some embodiments, step 514 may transition into step 515.

Continuing discussing FIG. 5, in some embodiments, step 515 may be a step of cooling the melt mixture 31d within the given human-made cavern 60 a predetermined temperature. In some embodiments, step 515 may be a step of cooling the melt mixture 31d to a final target temperature according to the predetermined temperature time profile (see FIG. 4) to provide annealing of the glass melt 31d without fracturing the glass material. In some embodiments, step 515 may transition into step 516.

Continuing discussing FIG. 5, in some embodiments, step 516 may be a step of removing (withdrawing) the downhole seal and packer system 63 and the power cable 38 from the given human-made cavern 60 and/or from wellbore 52, and back to the surface 37. In some embodiments, step 516 may transition into step 517.

Continuing discussing FIG. 5, in some embodiments, step 517 may be a decision check point. In some embodiments, at step 517 method 500 may be ascertaining if that given human-made cavern 60 is sufficiently filled with waste product 31d, in which case method 500 may process from step 517 to step 519; or if that given human-made cavern 60 may accommodate more waste product 31d, then step 517 may progress back to step 503. In this manner, sequential iterations of method 500 may occur within a single given human-made cavern 60; see also FIG. 3B to FIG. 3D which also illustrates this sequential iteration of method 500. In some embodiments, step 501 may determine how many iterations of method 500 may be appropriate for a given human-made cavern 60 and a given amount of waste 31d to be vitrified. In some embodiments, step 517 may progress into step 519; or step 517 may transition back to step 503.

Continuing discussing FIG. 5, in some embodiments, step 519 may be a step of stopping method 500. In some embodiments, method 500 may be initiated for a new human-made cavern 60.

In some embodiments, method 500 may be described as a method for in-situ vitrification of hazardous waste within at least one human-made cavern 60. In some embodiments, method 500 may comprise steps of: (a) drilling at least one substantially vertical wellbore and then under-reaming a portion of that at least one substantially vertical wellbore to form at least one human-made cavern; wherein the at least one human-made cavern is formed within a deep geological formation; wherein the deep geological formation is located at least two thousand feet below a terrestrial surface of the Earth—see e.g., step 502 discussion above; (b) preparing the hazardous waste for vitrification by making sure the hazardous waste is capable of liquefying with a predetermined amount of heat and then cooling to form a glass—see e.g., step 503 discussion above; (c) installing at least one heater into the at least one human-made cavern by lowering the at least one heater through the at least one substantially vertical wellbore on at least one cable—see e.g., step 504 discussion above; (d) introducing a predetermined amount of product from step (b) around the at least one heater that is located within the at least one human-made cavern—see e.g., step 505 discussion above; (e) installing a cold cap above the hazardous waste that is located within the least one human-made cavern; wherein the cold cap is an insulation blanket material—see e.g., step 506 discussion above; (f) installing a packer seal device into the at least one substantially vertical wellbore above the at least one human-made cavern to seal-off the at least one substantially vertical wellbore from the at least one human-made cavern—see e.g., step 507 discussion above; (g) melting the hazardous waste within the at least one human-made cavern into a liquid using the at least one heater—see e.g., steps 508, 509, and 511 discussion above; and (h) cooling the liquid into the glass—see e.g., step 515 discussion above.

In some embodiments, during the step (g), the at least one heater 50 may be reciprocated up and down within the liquid 31d. In some embodiments, during the step (g), the at least one heater 50 may not be reciprocated up and down within the liquid 31d. See e.g., FIG. 5.

In some embodiments, after the step (g), the at least one heater 50 may be removed from the liquid 31d. In some embodiments, after the step (g), the at least one heater 50 (may be disposable) may be remain within the liquid 31d. See e.g., FIG. 5.

In some embodiments, the step (d) through the step (e) are repeated until the least one human-made cavern 60 may be substantially filled to a predetermined capacity or there is no more of the predetermined amount of product from step (b). See e.g., FIG. 5. During iterations of method 500, step 503 and/or step 504 are only re-used (re-done) as needed.

In some embodiments, the step (g) and the step (h) proceed according to a predetermined heating and cooling profile (see e.g., FIG. 4 and its discussion).

In some embodiments, during the step (g) and the step (h), off-gas 34 produced from the melting of the hazardous waste 31d may be routed upwards through the at least one human-made cavern 60, to and through the (gas permeable) cold cap 30, and into a permeable rock portion 53d of the deep geological formation 53 at a top of the human-made cavern 60, wherein the off-gas 34c is contained within a region of the permeable rock portion 53d. See e.g., FIG. 3G.

Figure 6A:
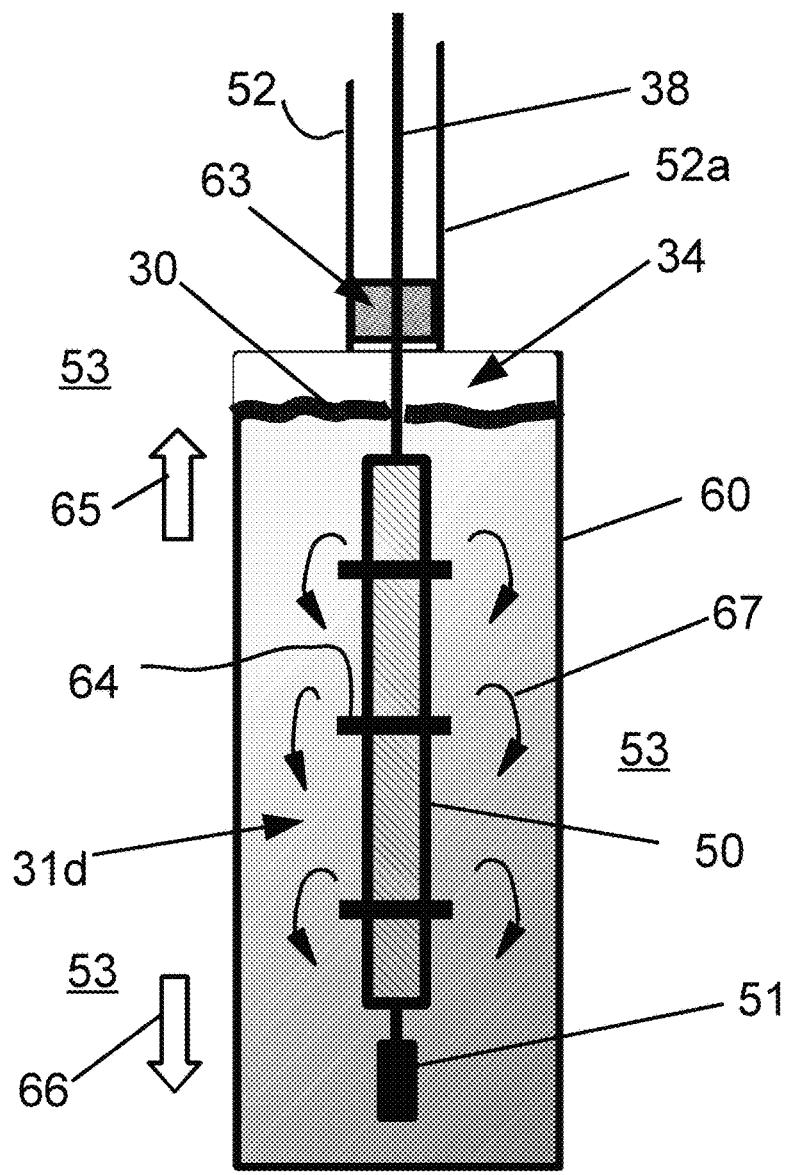
FIG. 6A may illustrate a heater described in the subject application for the deep underground vitrification of waste in which mixing vanes are implemented on the outside of the heater. These vanes may be of different predetermined geometric/structural types and produce mixing of the melt as shown by the flow lines when the heater is reciprocated up and down (back and forth).

FIG. 6A may depict at least one heater 50 described in the subject application for the deep underground vitrification of waste 31d within a given human-made cavern 60. In some embodiments, a given heater 50 may comprise one or more mixing vanes 64. In some embodiments, one or more mixing vanes 64 are implemented on an outside of a given heater 50. In some embodiments, at least one mixing vane 64 may be located on an exterior portion of the at least one heater 50. In some embodiments, the at least one mixing vane 64 may be configured to provide currents into the liquid 31d. In some embodiments, such mixing vanes 64 may be of different (and predetermined) geometric/structural types/shapes to facilitate mixing of the melt 31d as shown by flow lines 67 when the heater 50 may be reciprocated up and down. In some embodiments, mixing vanes 64 when moved in an upward direction 65 and then in downward direction 66 (or vice-versa) may impart currents to melt 31d indicated by flow lines 67. In some embodiments, such currents (flow lines 67) in melt 31d may facilitate more uniform mixing of melt 31d; which in turn may minimize differences in densities; which in turn may yield a more uniform glass that is less likely to fracture. In some embodiments, such currents (flow lines 67) in melt 31d may facilitate more uniform temperatures in melt 31d; which in turn may yield a more uniform glass that is less likely to fracture. In some embodiments, such currents (flow lines 67) in melt 31d may bubbles and/or off-gas 34 to move upwards for desired venting and long-term storage in the surrounding porous and permeable formation rock 53d. In some embodiments, flow lines 67 may be convective currents as heater 50 may be emitting heat into melt 31d. In some embodiments, disposed below and attached to the heater 50 system is at least one weighted mass or device 51 which maintains tension in the heater/cable 38 system.

In some embodiments, at least one heater 50 may be removably located within the liquid 31d. In some embodiments, the at least one heater 50 may be removably located within the liquid (waste 31d), the at least one human-made cavern 60, the at least one wellbore 52, combinations thereof, and/or the like.

Figure 6B:
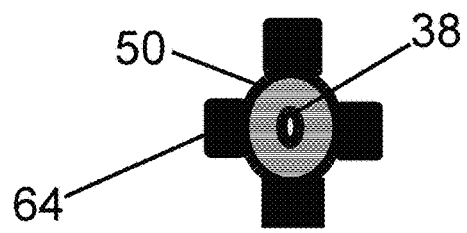
FIG. 6B may illustrate a top view of a heater described in the subject application for the deep underground vitrification of waste in which mixing vanes are implemented on the outside of the heater.

FIG. 6B may illustrate a top view of a heater 50 described in the subject application for the deep underground vitrification of waste 31d in which mixing vanes 64 are implemented on the outside of the heater 50. In some embodiments, these mixing vanes 64 may be of different (and predetermined) geometric/structural shapes and types. In some embodiments, 64 may be configured to yield currents (flow lines 67) in melt 31d (while still substantially liquid) during step 509 and/or step 511 of method 500.

Figure 7:
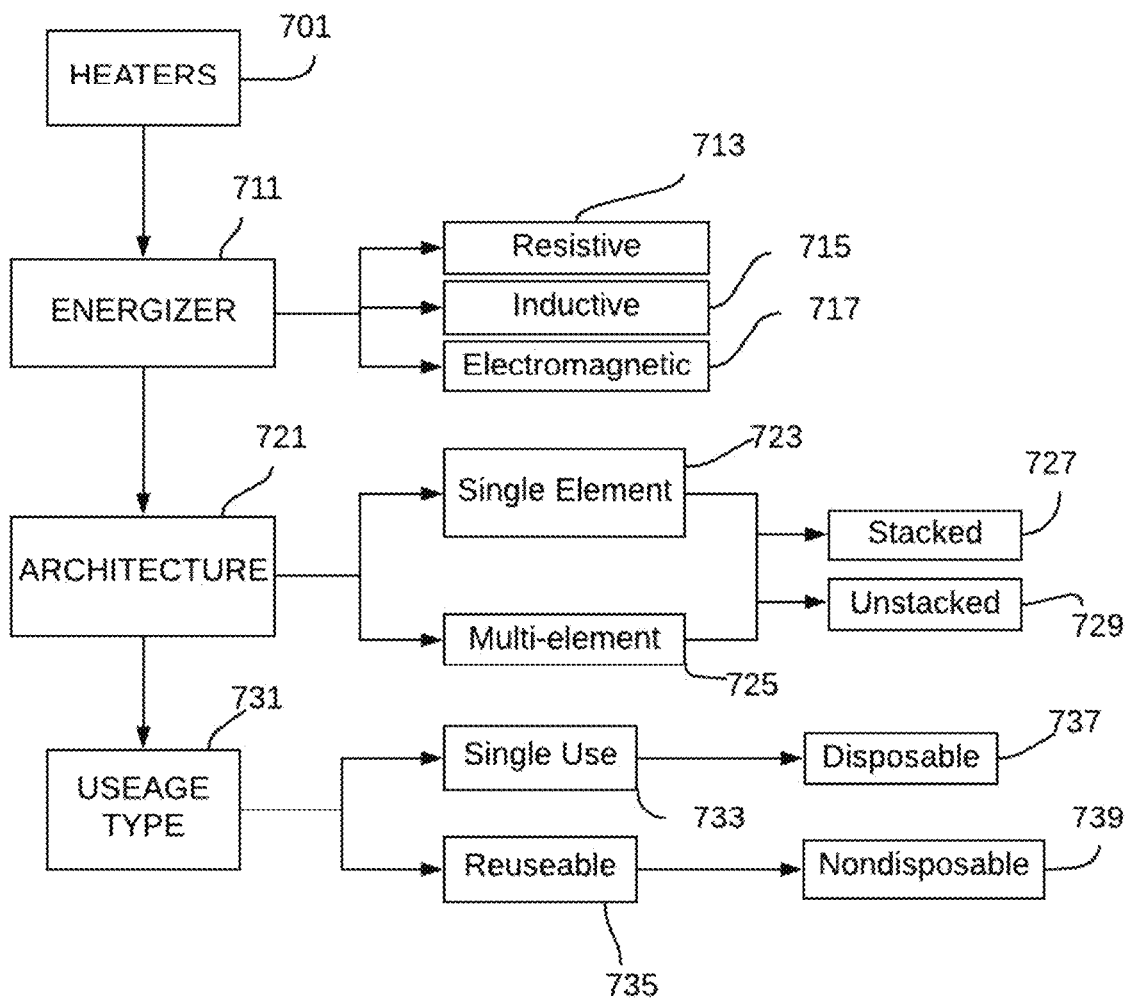
FIG. 7 may illustrate a flowchart of heater considerations and heater aspects that may be implemented by some embodiments of the present invention.

FIG. 7 may illustrate an overview of the heater 701 systems 700 and technologies which are available in the engineering disciplines today and that may be utilized for the at least one heater 50 in method 500. In the power industry, in the heavy oil recovery industry and in mechanical and electrical engineering applications there are many different types and varieties of heater 701 systems 700 which can be modified to meet the robust demands of the in-situ vitrification systems taught in this patent application.

Continuing discussing FIG. 7, in various embodiments of the application, the downhole heater 50 may be energized by a multiple types of different heater energizers 711, energizers 711 which may heat: by resistive heating 713, by inductive heating 715, by electromagnetic heating 717, combinations thereof, and/or the like. The proper selection of heater energizer 711 may depend on a variety of variables, such as, but not limited to: depth of the deep geological formation 53; type/characteristics of the deep geological formation 53; depth, length, and/or diameter of the given human-made cavern 60; electric costs; operating conditions necessary for vitrification; type/characteristics of the melt 31d to be vitrified; the volume/amount of specific melt 31d to be vitrified; melt 31d temperatures; cooling temperatures; combinations thereof, and/or the like. Existing heater elements including electrode construction material and components have been designed to reach temperature as high as 2,830 degrees Celsius. The expected temperature ranges in this new application are significantly less and generally in the range of 1,000 degrees Celsius to 1,500 degrees Celsius, i.e., well within the range of existing heating element/electrode systems today.

Continuing discussing FIG. 7, a further consideration in some embodiments of the present invention is the heater 50 design architecture 721. The selection process may include the choice of a single element 723 or multiple element 725 heaters 50 as shown in FIG. 3E, and FIG. 3F. An additional consideration in some embodiments of the present invention is whether to stack 727 or unstack 729 heater 50 elements. In some embodiments, stacking 727 may refer to vertically adding discrete heaters or heater elements above one another (e.g., in a serial fashion) inside the given deep human-made cavern 60. In some embodiments, stacking 727 may be configured in a parallel fashion (see e.g., FIG. 3F); and/or in serial (vertical end to end) fashion. In practice, stacking 727 may allow better heat distribution within the melt 31d under certain conditions of cavern 60 size. In some embodiments, a given heater 50 may have an architecture of a single continuous integral heater system 50.

Continuing discussing FIG. 7, a further consideration in some embodiments of the present invention is the heater 50 usage types 731. In some embodiments, a given heater 50 may be single use 733 (sacrificial) and/or disposable 737. In some embodiments, a given heater 50 may be intended for multiple uses 735 (reusable 735) and/or non-disposable 739. In some embodiments, single use 733 (sacrificial) and/or disposable 737 heaters 50 can be cheaper to manufacture and by design may be left inside the cooled vitreous glass material 31d. In some embodiments, multiple uses 735 (reusable 735) and/or non-disposable 739 heater(s) 50 may be returned to the surface 37 after a given vitrification use, refurbished and re-used.

In some embodiments, multiple uses 735 (reusable 735) and/or non-disposable 739 heater(s) 50 after being withdrawn (removed) from a treated amount/volume of melt 31d, but wherein that 50 may still be within that given human-made cavern 60, may be heated to boil and/or melt off any melt 31d residue on that given heater 50 (i.e., a heater 50 cleansing operation), prior to removal of that heater 50 from that given human-made cavern 60 (and/or prior to removal from the given wellbore 52). That is, the heater 50 cleaning operation may occur in the safety of the deep geological formation 53.

In some embodiments, a given heater 50 (and/or other downhole tools, components, and the like to removed) while being removed upwards towards surface 37 from a given human-made cavern 60 and/or from wellbore 52, may be heated, scrubbed, washed, and/or cleaned in well cellar 29 which may be located below and proximate to workover rig 28 (and below surface 37), such that the (heater 50) washings fall down into wellbore 52 and never reach surface 37 to create contamination problems.

In some embodiments, a given heater 50 may use resistive heating 713, inductive heating 715, electromagnetic heating 717, combinations thereof, and/or the like. In some embodiments, a given heater 50 may be single heating element 723 or multiple heating elements 725. In some embodiments, a given heater 50 may be stacked 727 (e.g., serially and/or in parallel). In some embodiments, a given heater 50 may be unstacked 729. In some embodiments, a given heater 50 may be single use 733 and/or disposable 737. In some embodiments, a given heater 50 may be reusable 735 and/or non-disposable 739. See e.g., FIG. 7.

Specific additional heater 50 features, for some heaters 50 contemplated herein, are illustrated in FIG. 6A and FIG. 6B, such as mixing vanes 64 and/or weighted device 51.

Figure 8:
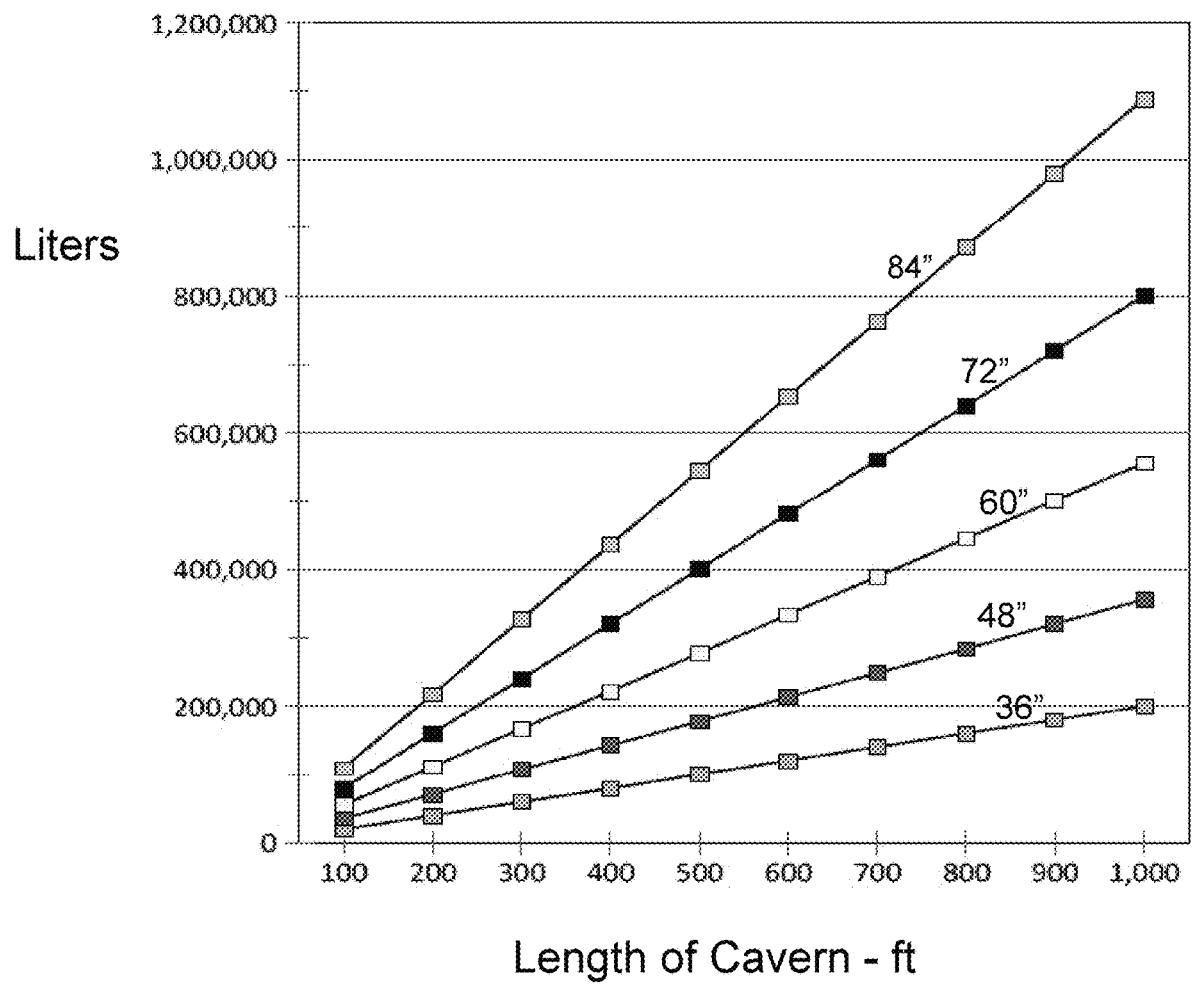
FIG. 8 may illustrate the capacity of an underground cavern at various sizes from 36 inches to 84 inches in diameter.

FIG. 8 may illustrate the capacity (volumetric capacity) of an underground human-made caverns 60, in liters, at various sizes from 36 inches to 84 inches in diameter of the given human-made cavern 60 and with respect to various lengths the given human-made cavern 60.

Complimentary to FIG. 8 may be Table 1.

Table 1 (shown below) may show volumetric capacities, in liters, of different human-made cavities 60 (e.g., human-made cavern 60) implemented in the host rock 53 as a function of the given human-made cavern 60 diameter and length.

TABLE 1

CAPACITY vs CAVERN DIMENSIONS
VOLUME- LITERS

| Cavern Length-Ft | Cavern Diameter - Inches | | | | |
|---|---|---|---|---|---|
| | 36 | 48 | 60 | 72 | 84 |
| 100 | 20,016 | 35,584 | 55,600 | 80,064 | 108,976 |
| 200 | 40,032 | 71,168 | 111,200 | 160,128 | 217,952 |
| 300 | 60,048 | 106,752 | 166,800 | 240,192 | 326,927 |
| 400 | 80,064 | 142,336 | 222,400 | 320,255 | 435,903 |
| 500 | 100,080 | 177,920 | 278,000 | 400,319 | 544,879 |
| 600 | 120,096 | 213,504 | 333,599 | 480,383 | 653,855 |
| 700 | 140,112 | 249,088 | 389,199 | 560,447 | 762,831 |
| 800 | 160,128 | 284,672 | 444,799 | 640,511 | 871,807 |
| 900 | 180,144 | 320,255 | 500,399 | 720,575 | 980,782 |
| 1,000 | 200,160 | 355,839 | 555,999 | 800,639 | 1,089,758 |

FIG. 8 and Table 1 illustrate that such human-made caverns 60 may be used to dispose of and/or long-term store enormous amounts waste on par with the demand for that disposal and/or long-term storage.

Some embodiments of the present invention may be characterized as a system (or systems) system for in-situ vitrification of hazardous waste within at least one human-made cavern 60. In some embodiments, such a system may comprise one or more of: the at least one or more human-made cavern 60, at least one heater 50, at least one power supply 54, at least one cable 38, at least one cold cap 30, at least one insulation blanket material 301, at least one weighted device 51, at least one downhole sealing packer system 63, at least one mixing vane 64, at least one wellbore 52, at least one casing 52a, unheated "tight" underground formations 53d (permeable rock portion 53d), off-gas volumes migrated into formation 34c, liquified and/or vitrified glass (waste) 31d, at least one workover rig 28 (and/or at least one full-blown drilling rig), at least one well cellar 29, combinations thereof, and/or the like.

Systems and methods for in-situ vitrification of predetermined waste products within human-made caverns, located within deep geological formations have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A system for in-situ vitrification of hazardous waste within at least one human-made cavern, wherein the system comprises:

the at least one human-cavern that is located entirely within a deep geological formation;
at least one heater that is disposed within the at least one human-cavern, wherein the at least one heater is configured to melt the hazardous waste received into the at least one human-cavern into substantially a liquid; wherein upon the liquid cooling below a predetermined temperature the liquid forms a vitrified glass;
at least one power supply configured for supplying the at least one heater with electrical power; and
at least one mixing vane; wherein the at least one mixing vane is located on an exterior portion of the at least one heater; wherein the at least one mixing vane is configured to provide currents into the liquid.

2. The system according to claim 1, wherein the deep geological formation is located at least two thousand feet below a terrestrial surface of the Earth.

3. The system according to claim 1, wherein the deep geological formation is one or more of: igneous rock, metamorphic rock, or sedimentary rock.

4. The system according to claim 1, wherein the system further comprises at least one cable; wherein the at least one power supply is located proximate to a terrestrial surface of the Earth; wherein the at least one cable runs from the at least one power supply to the at least one heater; wherein the at least one cable is configured to provide the electrical power from the at least one power supply to the at least one heater.

5. The system according to claim 4, wherein the at least one cable is configured to support a weight of the at least one heater.

6. The claim according to claim 1, wherein the system further comprises at least one weighted device; wherein the at least one weighted device is attached to the at least one heater; wherein the at least one weighted device is configured to maintain the at least one heater in a substantially vertically oriented position with an overall length of the at least one heater substantially parallel with respect to an imaginary longitudinal axis running substantially vertically of the at least one human-made cavern.

7. The system according to claim 1, wherein the system further comprises at least one centralizer; wherein the at least one centralizer is located within the at least one human-made cavern and disposed around at least a portion of the at least one heater; wherein the at least one centralizer is configured to maintain the at least one heater in a center of the at least one human-made cavern.

8. The system according to claim 1, wherein the system further comprises at least one cold cap; wherein the at least one cold cap is located and resides on top of the hazardous waste received into the at least one human-made cavern; wherein the at least one cold cap is configured to function as a heat sink, such that when the at least one heater is generating heat, temperatures below the at least one cold cap are higher than temperatures above and proximate to the at least one cold cap.

9. The system according to claim 1, wherein the system further comprises at least one insulation blanket material that is disposed between two layers of the hazardous waste within the at least one human-made cavern; wherein the at least one insulation blanket material is configured to substantially thermally isolate the two layers of the hazardous waste from each other.

10. The system according to claim 1, wherein the system further comprises at least one wellbore; wherein the at least one wellbore runs at least from a terrestrial surface of the Earth to the at least one human-made cavern.

11. The system according to claim 10, wherein a diameter of the at least one wellbore is less than a diameter of the at least one human-made cavern.

12. The system according to claim 10, wherein the system further comprises at least one downhole sealing packer system; wherein the at least one sealing packer system is disposed within the at least one wellbore and located closer to the at least one human-made cavern than to the terrestrial surface of the Earth; wherein the at least one downhole sealing packer system is configured to seal off the at least one wellbore from the at least one human-made cavern.

13. The system according to claim 10, wherein a majority of an interior of at least one wellbore is lined with a substantially cylindrical casing.

14. The system according to claim 1, wherein the at least one heater is removably located within the liquid.

15. The system according to claim 1, wherein the hazardous waste is one or more of: radioactive waste, high level radioactive waste, low level radioactive waste, or nuclear waste.

16. A system for in-situ vitrification of hazardous waste within at least one human-made cavern, wherein the system comprises:
the at least one human-cavern that is located entirely within a deep geological formation;
at least one heater that is disposed within the at least one human-cavern, wherein the at least one heater is configured to melt the hazardous waste received into the at least one human-cavern into substantially a liquid; wherein upon the liquid cooling below a predetermined temperature the liquid forms a vitrified glass;
at least one power supply configured for supplying the at least one heater with electrical power; and
at least one weighted device; wherein the at least one weighted device is attached to the at least one heater; wherein the at least one weighted device is configured to maintain the at least one heater in a substantially vertically oriented position with an overall length of the at least one heater substantially parallel with respect to an imaginary longitudinal axis running substantially vertically of the at least one human-made cavern.

17. The system according to claim 16, wherein the deep geological formation is located at least two thousand feet below a terrestrial surface of the Earth.

18. The system according to claim 16, wherein the deep geological formation is one or more of: igneous rock, metamorphic rock, or sedimentary rock.

19. The system according to claim 16, wherein the system further comprises at least one cable; wherein the at least one power supply is located proximate to a terrestrial surface of the Earth; wherein the at least one cable runs from the at least one power supply to the at least one heater; wherein the at least one cable is configured to provide the electrical power from the at least one power supply to the at least one heater.

20. The system according to claim 19, wherein the at least one cable is configured to support a weight of the at least one heater.

21. The system according to claim 16, wherein the system further comprises at least one centralizer; wherein the at least one centralizer is located within the at least one human-made cavern and disposed around at least a portion of the at least one heater; wherein the at least one centralizer is configured to maintain the at least one heater in a center of the at least one human-made cavern.

22. The system according to claim 16, wherein the system further comprises at least one cold cap; wherein the at least one cold cap is located and resides on top of the hazardous waste received into the at least one human-made cavern; wherein the at least one cold cap is configured to function as a heat sink, such that when the at least one heater is generating heat, temperatures below the at least one cold cap are higher than temperatures above and proximate to the at least one cold cap.

23. The system according to claim 16, wherein the system further comprises at least one insulation blanket material that is disposed between two layers of the hazardous waste within the at least one human-made cavern; wherein the at least one insulation blanket material is configured to substantially thermally isolate the two layers of the hazardous waste from each other.

24. The system according to claim 16, wherein the system further comprises at least one wellbore; wherein the at least one wellbore runs at least from a terrestrial surface of the Earth to the at least one human-made cavern.

25. The system according to claim 24, wherein a diameter of the at least one wellbore is less than a diameter of the at least one human-made cavern.

26. The system according to claim 24, wherein the system further comprises at least one downhole sealing packer system; wherein the at least one sealing packer system is disposed within the at least one wellbore and located closer to the at least one human-made cavern than to the terrestrial surface of the Earth; wherein the at least one downhole sealing packer system is configured to seal off the at least one wellbore from the at least one human-made cavern.

27. The system according to claim 24, wherein a majority of an interior of at least one wellbore is lined with a substantially cylindrical casing.

28. The system according to claim 16, wherein the at least one heater is removably located within the liquid.

29. The system according to claim 16, wherein the hazardous waste is one or more of: radioactive waste, high level radioactive waste, low level radioactive waste, or nuclear waste.

30. A system for in-situ vitrification of hazardous waste within at least one human-made cavern, wherein the system comprises:
the at least one human-cavern that is located entirely within a deep geological formation;
at least one heater that is disposed within the at least one human-cavern, wherein the at least one heater is configured to melt the hazardous waste received into the at least one human-cavern into substantially a liquid; wherein upon the liquid cooling below a predetermined temperature the liquid forms a vitrified glass;
at least one power supply configured for supplying the at least one heater with electrical power; and
at least one centralizer; wherein the at least one centralizer is located within the at least one human-made cavern and disposed around at least a portion of the at least one heater; wherein the at least one centralizer is configured to maintain the at least one heater in a center of the at least one human-made cavern.

31. The system according to claim 30, wherein the deep geological formation is located at least two thousand feet below a terrestrial surface of the Earth.

32. The system according to claim 30, wherein the deep geological formation is one or more of: igneous rock, metamorphic rock, or sedimentary rock.

33. The system according to claim 30, wherein the system further comprises at least one cable; wherein the at least one power supply is located proximate to a terrestrial surface of the Earth; wherein the at least one cable runs from the at least one power supply to the at least one heater; wherein the at least one cable is configured to provide the electrical power from the at least one power supply to the at least one heater.

34. The system according to claim 33, wherein the at least one cable is configured to support a weight of the at least one heater.

35. The system according to claim 30, wherein the system further comprises at least one cold cap; wherein the at least one cold cap is located and resides on top of the hazardous waste received into the at least one human-made cavern; wherein the at least one cold cap is configured to function as a heat sink, such that when the at least one heater is generating heat, temperatures below the at least one cold cap are higher than temperatures above and proximate to the at least one cold cap.

36. The system according to claim 30, wherein the system further comprises at least one insulation blanket material that is disposed between two layers of the hazardous waste within the at least one human-made cavern; wherein the at least one insulation blanket material is configured to substantially thermally isolate the two layers of the hazardous waste from each other.

37. The system according to claim 30, wherein the system further comprises at least one wellbore; wherein the at least one wellbore runs at least from a terrestrial surface of the Earth to the at least one human-made cavern.

38. The system according to claim 37, wherein a diameter of the at least one wellbore is less than a diameter of the at least one human-made cavern.

39. The system according to claim 37, wherein the system further comprises at least one downhole sealing packer system; wherein the at least one sealing packer system is disposed within the at least one wellbore and located closer to the at least one human-made cavern than to the terrestrial surface of the Earth; wherein the at least one downhole sealing packer system is configured to seal off the at least one wellbore from the at least one human-made cavern.

40. The system according to claim 37, wherein a majority of an interior of at least one wellbore is lined with a substantially cylindrical casing.

41. The system according to claim 30, wherein the at least one heater is removably located within the liquid.

42. The system according to claim 30, wherein the hazardous waste is one or more of: radioactive waste, high level radioactive waste, low level radioactive waste, or nuclear waste.

43. A system for in-situ vitrification of hazardous waste within at least one human-made cavern, wherein the system comprises:
the at least one human-cavern that is located entirely within a deep geological formation;
at least one heater that is disposed within the at least one human-cavern, wherein the at least one heater is configured to melt the hazardous waste received into the at least one human-cavern into substantially a liquid; wherein upon the liquid cooling below a predetermined temperature the liquid forms a vitrified glass;
at least one power supply configured for supplying the at least one heater with electrical power; and
at least one insulation blanket material that is disposed between two layers of the hazardous waste within the at least one human-made cavern; wherein the at least one insulation blanket material is configured to substantially thermally isolate the two layers of the hazardous waste from each other.

44. The system according to claim 43, wherein the deep geological formation is located at least two thousand feet below a terrestrial surface of the Earth.

45. The system according to claim 43, wherein the deep geological formation is one or more of: igneous rock, metamorphic rock, or sedimentary rock.

46. The system according to claim 43, wherein the system further comprises at least one cable; wherein the at least one power supply is located proximate to a terrestrial surface of the Earth; wherein the at least one cable runs from the at least one power supply to the at least one heater; wherein the at least one cable is configured to provide the electrical power from the at least one power supply to the at least one heater.

47. The system according to claim 46, wherein the at least one cable is configured to support a weight of the at least one heater.

48. The system according to claim 43, wherein the system further comprises at least one cold cap; wherein the at least one cold cap is located and resides on top of the hazardous waste received into the at least one human-made cavern; wherein the at least one cold cap is configured to function as a heat sink, such that when the at least one heater is generating heat, temperatures below the at least one cold cap are higher than temperatures above and proximate to the at least one cold cap.

49. The system according to claim 43, wherein the system further comprises at least one wellbore; wherein the at least one wellbore runs at least from a terrestrial surface of the Earth to the at least one human-made cavern.

50. The system according to claim 49, wherein a diameter of the at least one wellbore is less than a diameter of the at least one human-made cavern.

51. The system according to claim 49, wherein the system further comprises at least one downhole sealing packer system; wherein the at least one sealing packer system is disposed within the at least one wellbore and located closer to the at least one human-made cavern than to the terrestrial surface of the Earth; wherein the at least one downhole sealing packer system is configured to seal off the at least one wellbore from the at least one human-made cavern.

52. The system according to claim 49, wherein a majority of an interior of at least one wellbore is lined with a substantially cylindrical casing.

53. The system according to claim 43, wherein the at least one heater is removably located within the liquid.

54. The system according to claim 43, wherein the hazardous waste is one or more of: radioactive waste, high level radioactive waste, low level radioactive waste, or nuclear waste.

* * * * *